(12) United States Patent
Phipps et al.

(10) Patent No.: US 6,316,518 B1
(45) Date of Patent: Nov. 13, 2001

(54) METHODS OF TREATING POLYMERIC MATERIALS, METHODS OF FORMING NYLON, AND APPARATUSES

(75) Inventors: L. Myles Phipps, Shelton; Eric J. Swenson, Olympia, both of WA (US)

(73) Assignee: Advanced Polymer Technology, Inc., Shelton, WA (US)

( * ) Notice: Subject to any disclaimer, the term of this patent is extended or adjusted under 35 U.S.C. 154(b) by 0 days.

(21) Appl. No.: 09/497,701

(22) Filed: Feb. 3, 2000

Related U.S. Application Data

(60) Provisional application No. 60/118,951, filed on Feb. 5, 1999, and provisional application No. 60/118,762, filed on Feb. 5, 1999.

(51) Int. Cl.[7] ........................................... C08F 2/46
(52) U.S. Cl. .................... 522/151; 522/152; 522/156; 522/154; 522/104; 522/108; 522/90; 522/173; 528/480
(58) Field of Search ...................... 522/4, 104, 108, 522/90, 151, 152, 153, 154, 173, 174; 264/4; 528/480, 502 R

(56) References Cited

U.S. PATENT DOCUMENTS

| | | |
|---|---|---|
| 3,634,359 | 1/1972 | Breitschaft et al. . |
| 3,771,234 | 11/1973 | Forster et al. . |
| 3,821,171 | 6/1974 | Beaton . |
| 3,964,769 | 6/1976 | Shatzkin . |
| 4,020,267 | 4/1977 | Park . |
| 4,174,358 | 11/1979 | Epstein . |
| 4,222,176 | 9/1980 | Tjurin et al. . |
| 4,254,253 | 3/1981 | Brent, Jr. et al. . |
| 4,311,655 | 1/1982 | Siadat . |
| 4,332,091 | 6/1982 | Bensussan et al. . |
| 4,392,804 * | 7/1983 | Pushee et al. ............. 425/174.8 |
| 4,546,226 | 10/1985 | Trembley et al. . |
| 4,831,108 * | 5/1989 | Richardson et al. ............. 528/335 |
| 5,234,644 | 8/1993 | Schutze et al. . |
| 5,237,755 | 8/1993 | Lowe . |
| 5,269,980 * | 12/1993 | Levendis et al. ................ 264/4 |
| 5,341,576 | 8/1994 | Tsutomu et al. . |
| 5,373,646 | 12/1994 | Wosnitza et al. . |
| 5,391,694 | 2/1995 | Duh et al. . |
| 5,420,404 | 5/1995 | Goodman et al. . |
| 5,461,141 | 10/1995 | Sheetz . |
| 5,532,333 | 7/1996 | Stouffer et al. . |
| 5,543,495 * | 8/1996 | Anolick et al. ............. 528/481 |
| 5,955,569 | 9/1999 | Dujari et al. . |

FOREIGN PATENT DOCUMENTS

| | | |
|---|---|---|
| 2 463 787 | 2/1981 | (FR) . |
| 2 477 170 | 9/1981 | (FR) . |
| WO 97/49543 | 12/1997 | (WO) . |
| WO 98/23666 | 6/1998 | (WO) . |

OTHER PUBLICATIONS

Article: Mallon, F. et al., "Enhancement of Solid–State Polymerization with Microwave Energy", J. Appl Polym Sci, vol. 69, pp. 1203–1212 (1988).
Article: Slutsky, D., "It's Air Flow That's Critical in Drying of Plastics", Modern Plastics, undated, 2 pages.
Article: Kadykowski, R., "How to Dry the TP Polyesters", reprinted from Plastics Technology, undated, 4 pages.
Article: Whitehead, B., "The Crystallization and Drying of Polyethylene Terephthalate (PET)", Ind. Eng. Chem. Process Des. Dev., vol. 16, No. 3, pp. 341–346 (1977).
Article: Selected portion, "Technology Watch", Plastics World, Jul. 1988, pp. 12, 15.
Article: Selected portion, "Plastiscope: Processing", Modern Plastics, Feb. 1987, 1 page.
Article: W.T. LaRose & Associates, Inc., "Preheating for Thermoset Preforms and Other Dielectric Materials", presented at University of Wisconsin, College of Engineering, Oct. 1963, pp. 1–10.
Product Flyer: "Model '300', New Plastic/Rubber Preheater", W.T. LaRose & Associates, Inc., 2 pages.
Copy of International Search Report PCT/US00/02826.
Copy of International Search Report PCT/US00/20030.

* cited by examiner

Primary Examiner—James J. Seidleck
Assistant Examiner—Sanza McClendon
(74) Attorney, Agent, or Firm—Wells, St. John, Roberts, Gregory & Matkin, P.S.

(57) ABSTRACT

The invention includes a method of increasing polymerization within a condensation polymer. A substantially dry condensation polymer material is provided. The material is exposed to radiation having a frequency less than microwave frequency for a time of at least about 0.5 hour to increase an amount of polymerization within the material. The invention also includes a method of treating a polyamide material. A polymeric polyamide material is provided and exposed to first radiation having a first power intensity. The material is then exposed to second radiation having a second power intensity. The first power intensity is higher than the second power intensity. Additionally, the invention includes an apparatus. The apparatus includes an inlet port through which a feed material enters the apparatus, and an outlet port through which the feed material passes out of the apparatus. The apparatus further includes a feed material flow path from the inlet port to the outlet port, The flow path comprises at least two radio-frequency radiation reaction zones which comprise different power intensities of radio-frequency radiation relative to one another. The invention further comprises methods and apparatuses utilized for treatment and/or formation of nylon.

48 Claims, 11 Drawing Sheets

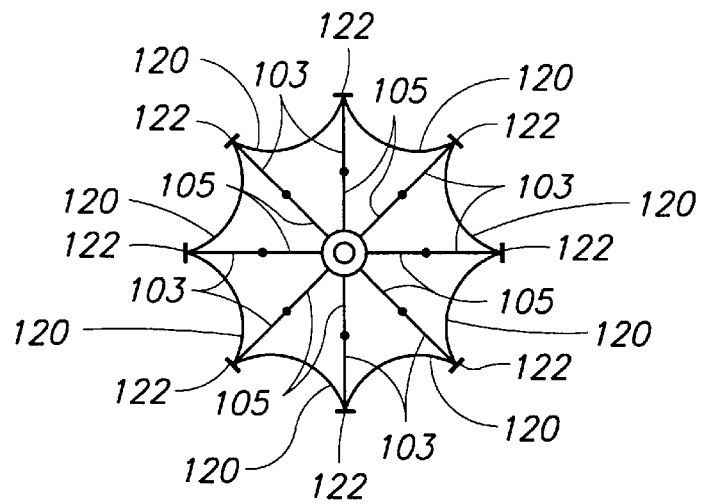
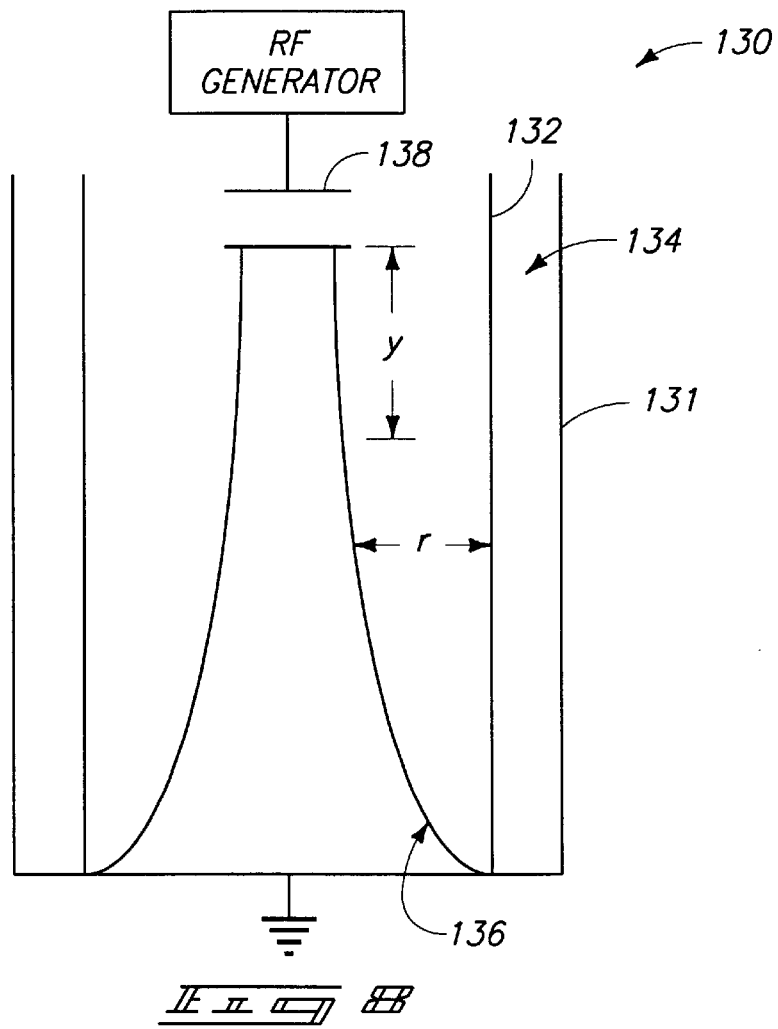

METHODS OF TREATING POLYMERIC MATERIALS, METHODS OF FORMING NYLON, AND APPARATUSES

RELATED APPLICATION INFORMATION

This application is related to U.S. Provisional Application Serial No. 60/118,951, which was filed on Feb. 5, 1999; and is also related to U.S. Provisional Application No. 60/118,762, which was filed on Feb. 5, 1999.

TECHNICAL FIELD

The invention pertains to methods of treating polymeric materials. The invention includes methods of increasing polymerization within polyamide, polyester, polyurethane, copolymers thereof, and condensation polymers in general, as well as methods of forming nylon. Additionally, the invention encompasses apparatuses configured for treating feed materials with radiation, such as, for example, radio-frequency (RF) electromagnetic radiation.

BACKGROUND OF THE INVENTION

A commercially important polymeric material is the polyamide known as nylon. A form of nylon (specifically, nylon-6) can be produced from caprolactam (CPL) utilizing the process described in FIG. 1. At a first step, CPL is mixed with water and initiators (such as, for example acetic acid). It is noted that the initiators are optional. It is also noted that other optional materials can be mixed with the CPL and water, including terminators and additives.

In a second step, a temperature of the mixture is increased to about 200° C. under pressure, which causes the ring of CPL to open. The ring opening is shown below in reaction 1, and forms 6-aminohexanoic acid (6-AHA).

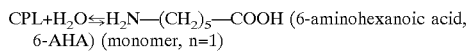

$\text{CPL} + \text{H}_2\text{O} \rightleftharpoons \text{H}_2\text{N}—(\text{CH}_2)_5—\text{COOH}$ (6-aminohexanoic acid, 6-AHA) (monomer, n=1)     I In a third step of the FIG. 1 process, the monomeric 6-AHA is heated to from about 240° C. about 260° C. to form polymers comprising 15 to 20 of the monomeric units. The reactions occurring during the initial polymerization comprise the addition reactions shown below as reactions II–IV, and condensation reactions shown below as reactions V and VI. The reactions referred to as "addition" (specifically, reactions II–VI) are identical in principle to the reactions referred to as "condensation" (specifically, reactions V and VI). However, an important distinction between the addition reactions and the condensation reactions is that condensation enables rapid chain growth with emission of only a single water molecule, whereas addition enables chain growth of only one monomeric unit per water molecule formed. This can enable condensation reactions to yield a greater rate of polymer growth than addition reactions. However, such is not always the case, as kinetics can become limited by the relative scarcity of available groups to perform polymerization as monomers become incorporated into polymeric units.

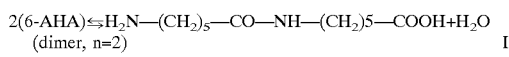

2(6-AHA)⇌H₂N—(CH₂)₅—CO—NH—(CH₂)5—COOH+H₂O (dimer, n=2)     II.

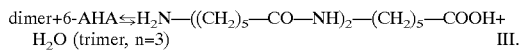

dimer+6-AHA⇌H₂N—((CH₂)₅—CO—NH)₂—(CH₂)₅—COOH+ H₂O (trimer, n=3)     III.

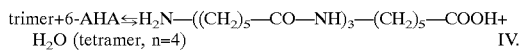

trimer+6-AHA⇌H₂N—((CH₂)₅—CO—NH)₃—(CH₂)₅—COOH+ H₂O (tetramer, n=4)     IV.

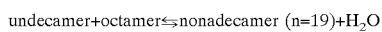

undecamer+octamer⇌nonadecamer (n=19)+H₂O     VI.

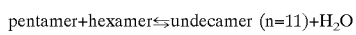

pentamer+hexamer⇌undecamer (n=11)+H₂O     V.

In the above reactions I–VI, "n" equals the number of monomeric units in a chain. Generally, addition reactions produce chain links wherein "n" is from about 5 units to about 20 units, and then the reaction changes character so that condensation (sometimes referred to as polycondensation) begins to predominate. Reactions I–VI are all fully reversible, with equilibrium constants somewhat greater than 1 for the reactions as written.

It is noted that the above-described reaction I utilizes water as a reactant, and reactions II–VI generate water as a by-product. The presence of water in the reaction mixture allows the reversal of every step of the polymerization processes of reactions II–VI, and accordingly the reacting materials utilized in reactions II–VI are typically flushed with a gas during the reactions to remove water from the reacting materials. The gas typically is a material which is inert relative to reaction with the materials of reactions II–VI, and can comprise, for example, nitrogen or argon. Because water is necessary for reaction I, and yet causes reversal of reactions II–VI, water is allowed to escape from the reaction chamber as steam after reaction I. The reaction chamber may also be sparged with an inert gas during this time to aid in the steam's escape. Removal of water can be an important determinant on the rate and degree of polymerization occurring under particular reaction conditions. (Mallon and Ray, Journ. of Applied Polymer Science 69, 1203 (1998); and U.S. Pat. No. 5,269,980). The rates of two amidation reactions can, in practices frequently be determined by a rate of water removal under a variety of conditions, including melt conditions, solid state polymerization (SSP) conditions, or conditions wherein the reactions are in the form of small droplets (see, for example, U.S. Pat. No. 5,269,980). Mallon and Ray have shown that the rate of solid state polymerization of polyamides can be dependent on the diffusion rate of water generated by an amidation reaction, and specifically by the rate at which water diffuses to the surface of chips of solid nylon and escapes into a surrounding environment.

Steps 1–3 of FIG. 1 typically occur in a pressurized vessel. The steps are described as separate steps because they are chemically distinct stages of a reaction process. However, it is to be understood that the steps typically do not comprise separate manipulations of a reacting mixture, but rather comprise different stages along a reaction continuum.

Referring to step 4 of the FIG. 1 process, a pressure of a vessel comprising the reacting mixture is reduced and water is vented. Such venting and reduction of pressure can be accomplished by, for example, opening a valve of a pressurized reacting vessel to allow escape of water vapor and other gases from the vessel. The de-pressurized reacting mixture is maintained at a temperature of from about 240° C. to about 260° C. to encourage condensation within the mixture and form polymers comprising from about 50 to about 200 monomeric units. The material formed in step 4 is extruded, cooled and chopped to form nylon chips in processing labeled as step 5 of FIG. 1. It is noted that the material of step 4 typically comprises a thick, sticky substance, and such substance is typically extruded through a number of holes to form long strands. The strands are then cooled and chopped to form chips on the order of about ⅛ inch in length and about ⅛ inch in diameter.

Referring to step 6 of FIG. 1, the chips are leached in hot water in a multiple-step process that takes from 15 to 20 hours to leach unreacted CPL from within the chips. The chips typically comprise about 10% unreacted CPL, as a result of the reactions I–IV being in equilibrium, and the leaching enables such CPL to be reclaimed from the chips. The leaching typically occurs at from 105° C. to 120° C.

Referring to step 7, the chips from step 6 of FIG. 1 are dried. Such drying typically comprises exposing the chips to warm nitrogen in a tumble dryer under a partial vacuum in a process that typically takes a number of hours.

After the chips are dried, they can be utilized in one or more of the FIG. 1 steps 8, 9 and 10; which comprise subjecting the chips to a solid state polymerization (SSP), selling the chips, and using the chips to form nylon products, respectively.

A quality of nylon chips is measured by a so-called formic acid viscosity (FAV) value, a measure of relative viscosity that reflects an average chain length within the nylon material. The formic acid viscosity value is determined with an 8.4% (weight/weight) solution of the nylon material in 88% formic acid, and reflects a viscosity of such solution. Higher FAV values typically indicate longer chain lengths within the nylon chips, and correspond to chips having higher value than would chips with lower FAV values.

The FAV values of chips at the processing of step 7 of FIG. 1 are typically about 40. If the chips are subjected to the SSP of step 8, the FAV values can be increased to 200 or higher. Nylon-66 undergoes SSP more rapidly and can reach FAV values of 500 or more. FAV values greater than 200 could, in theory, be obtained from the nylon-6 if the nylon were held in the reaction chamber of step 3 for a longer period of time. However, such is typically not practical because the increased viscosity of the nylon material would significantly slow a reactor's capacity, as well as complicate extrugion, pelletizing and leaching. Additionally, as the polymer melt becomes more viscous, difficulties in heat transfer can occur. Specifically, as the walls of a reactor become coated with highly viscous nylon material, it becomes difficult to stir the material within the reactor which can lead to non-homogeneous heat transfer, and eventually to charring of material within the reactor. In light of these complications, SSP is a preferred method of increasing the viscosity of nylon chips.

In a common method for accomplishing SSP, the dried chips from step 7 of FIG. 1 are placed in a reactor and subjected to heat and vacuum, or heat and an inert gas stream to remove product water, to cause the polymerization shown in reaction VII (below), wherein "n" and "m" are integers.

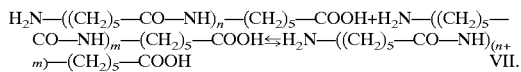

A given sample of nylon tends to consume molecules with smaller values of "n" and "m" first during an SSP reaction cycle because the mobility of the nylon molecules and the relative proportion of free reactive ends decreases as a function of molecular weight. In principle, the SSP reaction could proceed until the entire batch consisted of a single very large nylon-6 molecule. However, in practice such does not occur; instead the SSP reaction is stopped when a viscosity reaches a desired value. Although reaction VII is shown relative to condensation of nylon-6, it is to be understood that similar condensation reactions occur for other polymers.

Typically, the highest value of viscosity reached by nylon-6 corresponds to an FAV value of 200. Proceeding beyond the FAV value of 200 is typically impractical due to the long reaction times required. Even reaching an FAV value of 200 with current technology requires reaction times on the order of 48 hours. The long reaction times result from decreasing numbers of free reactive ends, and the fact that in the solid state a significant portion of the otherwise free ends become entrapped in the crystalline portion of the solid, further slowing reaction rates. The crystal-trapped ends can in theory be liberated by remelting the mass, re-extrusion into strands, repelletizing and redrawing. In practice, however, this is generally not done due to increased costs and complexity.

It would be desirable to develop improved methods for forming polyamide materials, such as, for example, nylon-6. It would further be desirable to develop improved methods for accelerating SSP processes.

SUMMARY OF THE INVENTION

In one aspect, the invention includes a method of increasing polymerization within a polyamide material. A substantially dry polymeric polyamide material is provided. The material is exposed to radiation having a frequency less than microwave frequency for a time of at least about 0.5 hour to increase an amount of polymerization within the material.

In another aspect, the invention includes a method of treating a polyamide, polyester, polyurethane, or other condensation polymer material. A polymeric polyamide, polyester, polyurethane, or other condensation polymer material is provided and exposed to first radiation having a first power. The material is then exposed to second radiation having a second power. The first power is different than the second power.

In another aspect, the invention includes an apparatus. The apparatus includes an inlet port through which a feed material enters the apparatus, and an outlet port through which the feed material passes out of the apparatus. The apparatus further includes a feed material flow path from the inlet port to the outlet port. The flow path comprises at least two radio-frequency radiation reaction zones which comprise different powers of radio-frequency radiation relative to one another.

The invention further comprises methods and apparatuses utilized for treatment and/or formation of nylon, polyester, polyurethane, or other condensation polymers.

BRIEF DESCRIPTION OF THE DRAWINGS

Preferred embodiments of the invention are described below with reference to the following accompanying drawings.

FIG. 7 is a diagrammatic, top view of the FIG. 4 fragment along the 7—7 of FIG. 6.

FIG. 8 is a cross-sectional, fragmentary, diagrammatic view of a portion of the FIG. 2 apparatus formed in accordance with a third embodiment of the present invention.

DETAILED DESCRIPTION OF THE PREFERRED EMBODIMENTS

Figure 1:
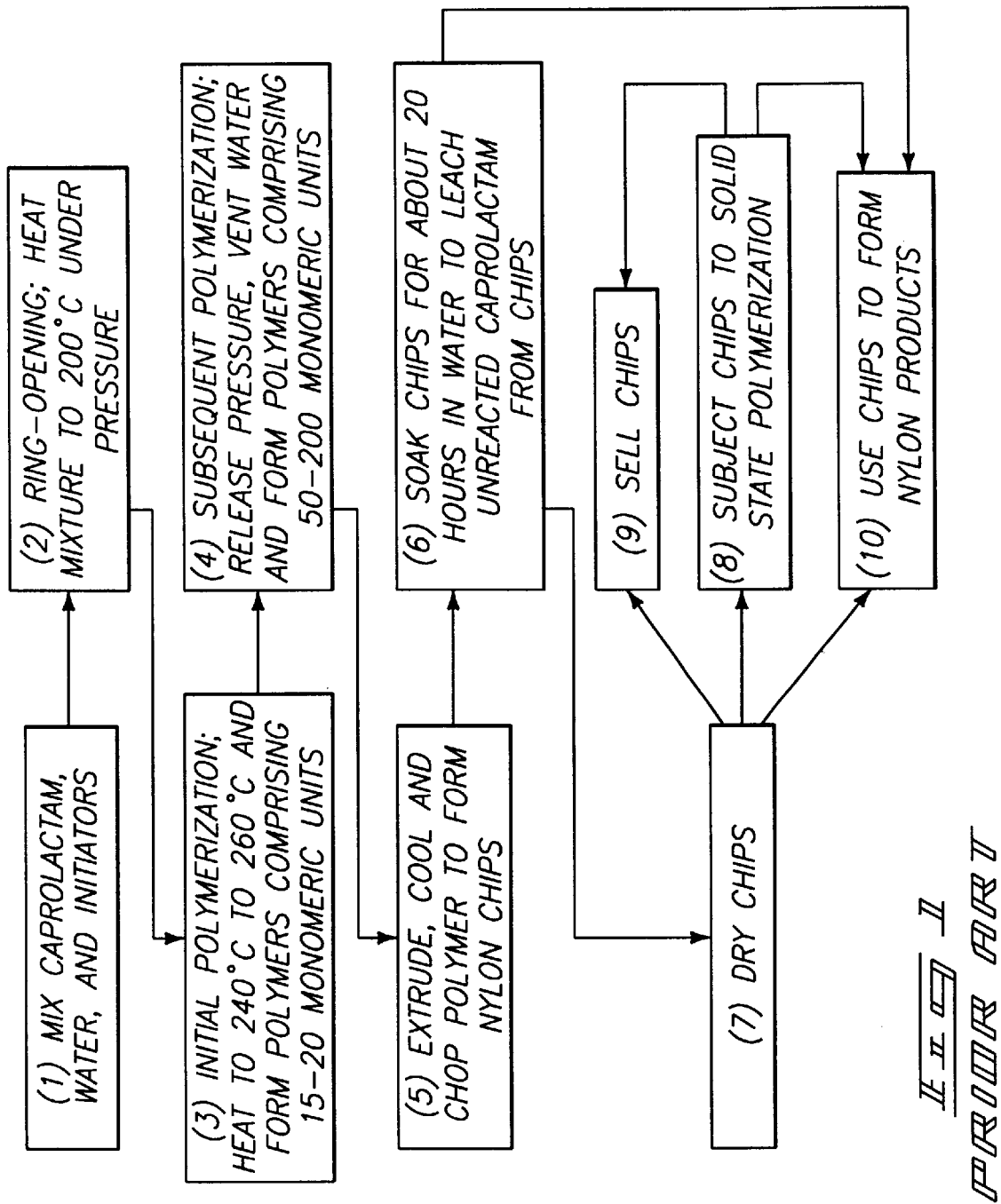
FIG. 1 is a flow-chart diagram of a prior art process for forming nylon-6.

This disclosure of the invention is submitted in furtherance of the constitutional purposes of the U.S. Patent Laws "to promote the progress of science and useful arts" (Article 1, Section 8).

The invention encompasses methods and apparatuses for exposing polymeric materials to radiation, and in particular embodiments to radio-frequency (RF) radiation, to improve qualities of the material. The invention can be utilized for numerous polymeric material, including polyamides (such as nylon copolymer), polyester, polyurethane or other condensation polymers. By way of illustration and without limiting the scope of the invention, the invention will be illustrated by the use of a commercially important polymeric polyamide known as nylon. In one aspect, the invention encompasses exposure of nylon-6 chips to radio-frequency electromagnetic radiation during SSP to increase an amount of polymerization relative to the amount which would occur in the absence of the radio-frequency radiation. The radio-frequency radiation is preferably not microwave radiation, and therefore preferably has a frequency of less than 1 GHz, and more preferably has a frequency of less than or equal to about 500 MHz. The radiation utilized in applications of the present invention can, for example, comprise a frequency corresponding to middle or high-frequency radio waves (i.e., a frequency of from about 300 kHz to about 30 MHz). It is noted, however, that particular applications encompassed by the present invention can utilize radiation which overlaps in frequency with microwave radiation (with microwave radiation being defined to comprise a frequency of from 1 GHz to 30 GHz).

In a specific aspect of the invention in which radio-frequency radiation is utilized to enhance an SSP reaction, the radio-frequency radiation can be utilized to enhance removal of water or other reaction by-products from reacting condensation polymer chains. As discussed above in the "Background" section, a rate of an SSP reaction is frequently limited and controlled by a rate of diffusion of reactant water from polyamide material, or by diffusion of reactant by-products from other condensation polymers. In prior art technologies, by-products, especially water, are removed utilizing one or both of reduced pressure and an inert sweeping gas. If it is assumed that water which has escaped from a surface of reacting polyamide materials is unlikely to be absorbed by another surface (a condition which can be substantially maintained by keeping a relative humidity of an ambient surrounding the reacting material very low), then it is the process of transport of water or other reaction by-products to a surface of the reacting material, and subsequent escape of that material into a gas stream, which controls a rate of an SSP reaction. As the transport of water or other reaction by-products from an interior of a reacting material to a surface of the reacting material generally occurs by diffusion, acceleration of the diffusion rate of water or other reaction by-products should accelerate a rate of polymerization within a polyamide or other condensation polymer material. The net acceleration of polymerization rate results because water is a reactant of the depolymerization reaction (i.e., the right-to-left direction of reactions V and VI above).

Diffusion rates are a function of the temperature of a diffusant, and therefore a rate of diffusion of water can be accelerated by performing an SSP reaction at a highest possible temperature. However, the SSP reaction temperature is limited by a melting point of the reacting polyamide, which for nylon-6 is about 230° C. Current SSP procedures for nylon-6 typically use temperatures of around 180° C. Higher temperatures are generally avoided in practice because conventional temperature control in a typical SSP reactor is imprecise enough that closer approach to the melting point risks causing the batch to become sticky or fully melt, or perhaps to yellow if oxygen contacts the heated polyamide.

In conventional practice, at temperatures of about 180° C., a nylon-6 material having an FAV value of from 40 to 50 will become a material having an FAV value of from 100 to 120 in from about 18 to about 24 hours, and will become a material having an FAV value of about 200 in from about 40 to about 50 hours. Accordingly, the average relative viscosity increase is about 3 to 3.5 FAV units per hour.

A polycondensation reaction of polyamide material (such as, for example, nylon-6) is mildly exothermic (6 to 7 kcal/mole of amide linkages), and the evaporation of water from the surface of the material is mildly endothermic (9.7 kcal/mole of water evaporated). The formation of one mole of new amide linkages is accompanied by the formation of one mole of water. Overall the net energy of the polycondensation reaction, followed by water removal to assure that the reversible reaction is driven in the direction of product, is endothermic to an extent of approximately 2 to 3 kcal/mole. Thus, the polycondensation reaction will cool itself off, and eventually slow to a stop, unless driven by an external energy source. Accordingly, a rate-controlling step (i.e., diffusion of water) is driven by externally applied energy. In conventional processes, such energy is provided by, for example, flowing hot inert gas over nylon-6 chips during an SSP process.

A maximum water content of approximately 0.1% by weight is typically needed for nylon-6 chips to undergo SSP. If a population of polymer molecules is assumed to be homogeneously n=100, the ratio of polyamide molecules to water molecules is approximately 2:1. Water molecules are therefore likely to undergo many collisions with nylon molecules during diffusion of the water molecules from a material during SSP. Since the polyamide molecule contains "n" amide linkages, the water molecule can be thought of as having 100 depolymerization "targets" per nylon-6 molecule, or because of the 2:1 nylon-6:water mole ratio, a total of 200 depolymerization targets per condensed molecule. At the high temperatures at which it is typically desired to run SSP reactions, water is very reactive and potentially destructive relative to nylon-6. Such reactive water molecules have a very large number of opportunities to depolymerize a chain of nylon-6 while passing outward through the bulk of the chip, as it passes a large number of large, highly convoluted nylon molecules, and accordingly many depolymerization steps (effectively backward steps in the process of attempting to polymerize nylon-6) occur during an SSP process. Accordingly, it is desired to remove reactant water from SSP as quickly as possible to provide the highest SSP reaction rate.

Under ordinary thermal excitation, the large and growing polymer chains in an SSF process are in thermal equilibrium with water molecules that are generated during the process. However, because the molecular weight of water is so small, the water molecules are kept relatively "cool" by collisional encounters with larger polymer molecules. This effect can be exaggerated by the water molecules actually only colliding with short segments of the polymer molecules, which can in turn transfer or disperse the energy of collision efficiently up and down a polymer chain through rotational and vibrational modes. Accordingly, water molecules in thermal equilibrium with nylon-6 during SSP are, on average, relatively cool compared to the nylon polymers. The water molecules are thus undergoing, on average, relatively slower translational motion than would be associated with the temperature of the polymer, and as a consequence diffuse more slowly than expected at a particular polymer temperature. Such slow diffusion can retard the forward polymerization reaction (the left-to-right direction of reactions V to and VI), and can accelerate the depolymerization corresponding to the reverse reaction. The net effect is an overall retardation of an SSP rate.

In light of the above discussion, three ways to accelerate the rate of an SSP reaction are: (1) provide a means to accelerate diffusion of water to the surface of a nylon chip; (2) provide a means to accelerate the escape of water from a surface of a nylon chip; and (3) provide a means to prevent recondensation of water onto a chip after the water has been removed from another chip.

Goals 1 and 2 can be achieved by microwave irradiation of nylon chips within an SSP reactor utilizing a microwave frequency of about 2450 MHz. Such frequency of microwave radiation is known to be selective for excitation of water molecules. It has previously been shown that microwave radiation having a frequency of 2450 MHz will accelerate an SSP reaction in both polyethylene terephthalate (PET) and nylon-66. The acceleration was attributed to a greater diffusion of product water to the surface of a chip, and subsequent escape of that water from the chip's surface.

The present invention, in contrast to the microwave process described above, can utilize radiation having a frequency much less than 2450 MHz (preferably radio-frequency radiation having a frequency in the range of from 1 to 500 MHz) to enhance a rate of an SSP process. The lower frequencies of radio-frequency radiation produce heating in a substance through a different mechanism than that of microwave heating. Specifically, whereas microwave heating applies energy by providing a tuned frequency that excites a specific quantum mechanical transition within a molecule, the radio-frequency radiation is insufficient to cause changes in vibrational states of molecules. Therefore, the radio-frequency radiation provides energy to a molecule by first coupling with the molecule through its loss tangent, and then by providing energy via dielectric losses from an imposed radio-frequency field.

Although not all molecules couple well with radio-frequency fields, the heating effect of a radio-frequency field can be more general than that of microwave energy. Also, because radio-frequency fields act throughout a body of a material, they are able to provide heating throughout the body. In contrast, microwaves generally heat to only a depth of their penetration into a body, which is usually a distance of one inch or less. Heating to a greater depth than that with microwaves typically relies on conduction and/or convection of heat resulting from a temperature gradient. Radio-frequency heating instead relies only on uniform penetration of an electric and magnetic field through a body, and accordingly can heat all points within the body simultaneously, to provide heat deeply and uniformly throughout the body. Since many polymeric materials of interest are poor conductors of heat, the use of microwaves can be limited relative to utilization of radio-frequency radiation. Nylon-6, other polyamides, polyesters, and polyurethanes are examples of materials that are notoriously poor heat conductors.

Particular aspects of the invention are recognition that radio-frequency radiation can be utilized for both drying (step 7 of FIG. 1) and SSP (step 8 of FIG. 1) of polyamide materials, such as, for example, nylon-6. Although it is known in the art that many materials, including polymers, can be dried utilizing radio-frequency energy (see, for example, U.S. Pat. Nos. 4,567,340; 4,104,804; and 5,420,404), the art does not also utilize radio-frequency energy for SSP in accordance with procedures described below relative to the present invention.

Radio-frequency energy can be particularly advantageous for drying and SSP of polyamide materials. A high polarity of polyamide molecular structures enables efficient coupling of polyamide materials to absorb radio-frequency energy, independent of the coupling and heating of any impurity molecules (such as, for example, reaction by-products) in the matrix. Such fortuitous combination can allow a designer of radio-frequency equipment to produce a combination radio-frequency processor which utilizes the following profile to both accomplish both drying and solid state polymerization of a polyamide in a continuous fashion to quickly produce high viscosity polyamide (HVPA):

(1) start with wet, low viscosity polyamide (LVPA);

(2) dry the polyamide (utilize cold LVPA plus high intensity radio-frequency radiation to form hot LVPA plus water); and (3) subject the polyamide to solid state polymerization (specifically, subject the hot LVPA to continuous low-intensity RF to form HVPA plus water).

The high intensity RF can be, for example, radio-frequency radiation having a power intensity on the order of 5 kW per kilogram of material to be treated, and a frequency of from about 20 MHz to about 80 MHz. The low intensity RF can be, for example, radio-frequency radiation having a power intensity of 0.5 kW per kilogram of material or less, and a frequency of from about 20 MHz to about 80 MHz. Because the LVPA couples readily with RF radiation after the main bulk of water from drying has been removed, SSP can proceed with continuous low-level RF energy. This can occur even if the water content drops go low that effective maintenance of the necessary heating would be difficult or impossible if water were the only material being coupled to the RF. Continuous maintenance of the RF energy can enable rapid SSP because the RF energy is able to couple to both the polyamide itself and the water within it, and through such coupling can generate an effective mechanism for accelerating diffusion and consequent escape of water from a reaction site.

RF energy has previously been proposed for use in conjunction with SSP of polymers. For instance, U.S. Pat. No. 3,634,349 indicates that unspecified "high frequencies" are utilized to preheat a polymer to sufficient temperature to allow SSP processes to occur. However, the patent utilizes the high frequency as a means to quickly heat a polymer to an SSP temperature, rather than using the RF energy to continuously treat a polymer during an SSP process. U.S. Pat. No. 4,254,253 also specifies that RF frequencies can be utilized to produce rapid heating of a polymer to an SSP temperature. Again, however, the RF energy is utilized for a preliminary heating, rather than being utilized for an entirety of an SSP polymerization process.

In contrast to the processes described above relative to U.S. Pat. Nos. 3,634,359 and 4,254,253, an embodiment of the present invention exposes a polymeric material to RF energy during an entirety of an SSP process. Specifically, the material is exposed to RF energy at an initial "high power" stage to heat the material, and then exposed to RF energy at reduced power (i.e., a subsequent "low power" stage) during the remainder of an SSP reaction to accelerate the reaction. The initial "high power" heating can serve not only to preliminarily heat the polymeric material, but also to dry the polymeric material. The high power stage can accordingly form a substantially dry material (i.e., a material having less than about 0.3%, by weight, of water) prior to the RF exposure of the low power stage. Although the term "substantially dry" is utilized herein to refer to a material having less than about 0.3% water (by weight), it is recognized that a precise determination of water content can be difficult because water is generated during the SSP reaction processes. Therefore water content measurements performed by standard means such as Karl Fischer titrations, weight loss, quantitative IR, etc., are known to contain some inherent error.

The frequency of RF energy utilized for both the high and low power stages is preferably from about 1 MHz to about 500 MHz, mote preferably from about 13 MHz to about 100 MHz, and most preferably from about 20 MHz to about 80 MHz. The frequency utilized for the high power stage can be the same or different than that utilized for the low power stage. A power intensity of the RF radiation utilized for the high power stage is preferably at least 1.5 kW per kilogram of material being treated, and more preferably about 5 kW per kilogram of material being treated. The power intensity utilized for the low power stage is preferably less than or equal to about 0.5 kW per kilogram of material being treated, and more preferably less than or equal to about 0.1 kW per kilogram of material being treated. It is noted that if the high power stage is utilized for drying a material, such can effectively substitute for the drying referred to as step 7 in the prior art process is of FIG. 1.

A combined time of the high and low power stages can be at least about two hours and less than about seven hours. A suitable time of the low power stage can be at least about 0.5 hours. The RF energy is preferably applied for from about 15% to about 100% of a total SSP reaction time. Also preferably, the power of the RF radiation and total time of exposure to the radiation are such that deleterious effects such as clumping, stickiness, polymer degradation and melting do not occur. Further, the low power stage preferably occurs for a longer time than the high power stage for economic reasons.

Once an SSP reaction begins, it can be accelerated by the low power RF radiation. A possible mechanism is that the radiation can maintain a constant excitement of product water, which can increase a rate of diffusion, and consequently a rate of a polycondensation reaction to drive SSP.

The present invention preferably utilizes non-microwave RF radiation to drive the SSP, rather than microwave radiation (it is noted that a higher end of the RF frequencies is defined in some reference materials to overlap with a lower end of microwave frequencies, and accordingly the phrase "non-microwave RF radiation" is utilized herein to describe RF frequencies outside of the microwave bands). Non-microwave RF radiation is preferable to microwave radiation for several reasons. For instance, non-microwave radiation can be easier to generate than microwave radiation. Microwave radiation typically requires a waveguide and will penetrate only shallowly into a substrate. In contrast, RF radiation can be transmitted through a coaxial cable, and will penetrate throughout a substrate.

The parallel electrodes utilized for generating RF radiation can be formed of very large plates to enable 10 square feet or more of area of substrate material to be treated. The parallel electrodes can be configured to provide a uniform field in a volume between them, and thus to transmit equal amounts of energy to each volume element. Consequently, an entire volume of substrate can be exposed to about the same amount of RF power, and will thus heat uniformly throughout its volume. It can be preferable that homogeneity of an applied RF field and intensity of the applied RF field are precisely controlled. It is noted, however, that if the substrate is heterogenous, a degree of heating of various molecules present can vary, depending on the loss tangent of the particular molecules. This can provide a degree of selectivity in the heating rates of different substances in a mixture, solution or complex system (such as a nylon-6 reaction mixture). In contrast, microwaves, having a higher degree of selectivity of absorption by water, will heat a heterogeneous, complex system via intermolecular collisions. RF provides an environment at the microscopic level that is differentiated somewhat in absorption power, but also provides an environment which is "warm" for escaping water molecules, and can thus facilitate escape of the molecules from a reacting mixture.

An additional advantage of non-microwave RF radiation relative to microwave radiation is that microwave energy sources tend to be of relatively low power levels, typically less than 75 kW. In contrast, RF sources can commonly deliver power levels in the hundreds of kilowatts.

As discussed previously, it can be desirable to remove water from a condensing polymer at a high rate during an SSP process. A method which can be utilized for removal of water during the low power stage of an RF process of the present invention is to run an RF SSP reactor at atmospheric pressure, and sweep processed material with an inert gas (with the term "inert" being understood to mean a gas inert relative to reaction with the processed material). Preferably, the gas will be treated to remove moisture it picks up, and then recycled back to the reactor. A potential disadvantage of atmospheric pressure systems is that they can require large rates of gas flow, and such rates can be costly to sustain throughout an entirety of the time of an SSP process.

Another method for removing water from a radio-frequency SSP reactor is to maintain a reduced pressure within the reactor, and to rely on a vacuum system to remove moisture from the reactor at a sufficient rate. A potential difficulty with this system is that an evacuated chamber may provide too little cooling to a reactive material and result in excess heat being retained within the material.

A third system which can be utilized to remove water from a radio-frequency SSP reactor is to utilize a combination of an inert sweeping gas and vacuum. Specifically, a treated material is maintained under sufficiently low pressure so that water readily escapes from the material, and an inert gas at sub-atmospheric pressure is swept over the material to enhance removal of the water and to provide some temperature control of the material. The inert gas can be pre-cooled relative to entry into the reactor to provide enhanced cooling, or it can be introduced into the reactor at a temperature comparable to that of the treated material. Alternatively, the gas can be introduced into the reactor at a temperature warmer than that of the treated material if heating of the material is desired.

Utilization of radio-frequency energy during an entirety of an SSP process can enable substantial improvement in a rate at which polymerization occurs (as measured by FAV values), and can enable higher amounts of total polymerization than are practically achievable with prior art methods. Specifically, a system of the present invention has been utilized to expose nylon-6 chips to a temperature of from about 190° C. to about 205° C. and an RF frequency of about 40 MHz and a power intensity of from 150 kW per kilogram of material to 2500 kW per kilogram of material (with 150 kW per kilogram of material being utilized to maintain SSP and 2500 kW per kilogram of material being utilized to initially heat the material). Such exposure is found to increase viscosity of the material by about 7 to about 10 FAV units per hour (which is from about three to about five times faster than prior art methods). The increase in a rate of FAV change for a system applying continuous RF during SSP appears to be greater than that which can be explained on the basis of thermal effects alone, and accordingly appears to indicate that there is an enhancement of SSF beyond that which can be explained or predicted from thermal effects. In particular embodiments, a polyamide material (such as, for example, nylon-6), is exposed to RF energy for a time of at least about 0.5 hours during SSP and an FAV value of the material increases by at least a factor of 2, preferably a factor of 3, and more preferably a factor of 4. For instance, an FAV value of a polyamide material can increase from a value of 50 to a value of 200 through utilization of the RF-enhanced SSP of the present invention.

Although the processes described above utilize application of RF energy during drying of polymeric material and/or during subsequent SSP of the material, it is to be understood that RF energy can be applied at other parts of a reaction process. For instance, in the process of forming nylon, RF energy can be applied during any of reaction steps 1–8 in FIG. 1. There may, in fact, be advantages to applying RF energy during steps 2–4 in that it may enhance the respective rates of such steps. Further, if RF stimulation enhances ring opening in step 2, it may reduce an amount of unreacted CPL at steps 3 and 4 so that the leaching of step 6 can be eliminated. Even if such leaching is not eliminated, processing of the present invention can eliminate the large dryers conventionally utilized at step 7 of FIG. 1, and accordingly may enable smaller and more efficient nylon production facilities to be constructed.

Another advantage of utilizing RF (beyond the water-removal and condensation-enhancing advantages described above), is that RF radiation can also help other small molecules, besides water, to be eliminated from a polymer matrix. For instance, RF radiation can enhance removal of unreacted CPL from nylon-6. This can enable RF energy to be used to remove unreacted CPL at step 6 of the FIG. 1 process. Such removal could be utilized either in combination with, or substitution for, the water leach which is conventionally utilized. Even if RF energy is utilized only for RF-enhancement during SSP of nylon-6, there is frequently some CPL removed from a treated material during the SSP Such CPL is preferably swept into an inert gas stream and subsequently extracted from the stream for re-use in forming nylon-6.

In embodiments in which RF energy is utilized to replace steps 6 and 7 of FIG. 1, a particular procedure is as follows. First, the polymerization described as steps 1–4 of FIG. 1 proceeds to form a polymer having enough viscosity to produce easily handled chips, such as chips having FAV values of from about 20 to about 25. This material is then transferred to an RF reactor that performs the function of removal of unreacted CPL (steps 6 and 7 of FIG. 1) and SSP (step 8 of FIG. 1). The RF reactor first applies high intensity RF to raise the temperature of the polymeric material to from about 160° C. to about 170° C. The RF energy is then decreased to a lower operation level and is kept on continuously. At first, a primary process occurring within the polymer will be volatilization of CPL. As CPL levels drop SSP will become a primary process occurring within the polymer. A temperature of the polymer can be allowed to drift slowly upward as an amount of unreacted CPL within the polymer decreases. Since evaporation of CPL is endothermic, removal of CPL can provide some cooling for the SSP reaction system.

In further embodiments of the invention, RF energy can be applied continuously during steps 2–4 (i.e., before a polymer is extruded from a reactor). The RF energy can be provided to the same reactor that initial polymerization occurs in, or alternatively a polymerized melt can be pumped from the reactor to an RF section for the RF processing. In either event, RF energy can be applied to a polymer melt to remove water as well as unreacted CPL from the melt. Since thy RF energy maintains CPL in a thermally excited state, a tendency for the CPL to escape can be enhanced relative to ordinary thermal heating. In a melt, the pathways by which CPL molecules find their way to a surface are necessarily long and tortuous if a melted material is in the form of a deep "lake". Accordingly, embodiments in which CPL is removed from a melted polymer preferably employ a mechanism by which the polymer melt is spread thinly or divided into small droplets to facilitate water and CPL escape. Such can be accomplished by reactors which wipe a film across a surface, reactors which enable a film to fall along the surface, reactors utilizing ultrasonic energy to disperse a treated material, and/or reactors utilizing spray nozzles to disperse a treated material. Once the melt has sufficiently emitted extractables and obtained a suitable viscosity, it can be extruded, pelletized and subjected to one or more of steps 7–10 of FIG. 1.

EXAMPLES

The FAV values of the following examples were determined at 25° C. and in an 8.40% (by weight) solution of PA-6 in 88% formic acid (Aldrich Chemical Co., Milwaukee, Wis., reagent grade). Cannon-Finske glass capillary viscometers were used. For FAV values below 100, series 200 viscometers were used, and for FAV values above 100, series 300 viscometers were used.

RF experiments were done using a porous-bottom box (12"×12"×6"), with 6 inches corresponding to the depth. The box was constructed of a silicone/phenolic-bound glass fiber board material known as G7 (available from, among others, Laird Plastics, Seattle, Wash.). G7 material was chosen because it has a very low tendency to couple with RF energy. The body and bottom of the box were constructed of ½" thick G7, and the porous plate was constructed of ¼" thick G7. The box was fastened together with teflon screws, in drilled and tapped holes. The joints were sealed with clear silicone adhesive (GE brand). To create the porous bottom, the inner plate, which was generally held upon G7 spacers to create a ¾" deep plenum for the introduction of inert nitrogen gas, was drilled with closely spaced ⅜" holes. The edges; of these holes were beveled with a conical grinder stone, available at hardware stores. The stone is designed to be driven by an electric drill motor. The beveling was done to eliminate the sharp edges of the holes, especially the slight raggedness that resulted from the drilling operation. Sharp edges are potential arc points when RF energy at high voltage is applied. The holes in the porous plate were larger than the nylon-6 (PA-6) chips, so a layer of open-weave KEVLAR™ cloth, similar to burlap, was used as a sheet over the G7 plate. The weave of the KEVLAR™ was open enough so that it provided very little, if any, impedance to the flow of the inert gas, and it retained the chips above the porous plate. Inert gas (dry nitrogen) was supplied through a floating ball flowmeter into a ¾" i.d. silicon rubber tube (SILBRADE™, available from New Age Plastics, Inc., Plastics Technology Group, Willow Grove Pa.) then through a ½" teflon fitting that was threaded through the sidewall of the box and directly into the plenum below the porous plate. The silicon tubing had essentially no tendency to couple with the RF energy, and remained cool throughout all the experiments. In some experiments, the bottom and/or sides of the box were covered with a ¼" sheet of RF-inert insulative material available under the tradename of PYRO-PEL MD-12™ from Albany, Intl., of Mannsfield, Mass.

RF energy was supplied by a 35 kW RF oven, manufactured by Thermall. The Thermall company has since merged with Radio Frequency Company, Millis, Mass. This model oven is normally operated at one of two power settings, corresponding to voltages of around 6,000 V (RMS) on the "high" setting and around 3,500 V (RMS) on "low" (operating voltage is dependant upon the applied load). The oven is also provided with a set of tap points, which, when in use, reduce the operating voltages to the RF oscillator tube to approximately 60% of its setting value. This is used primarily to decrease the operating voltage, thus lowering the total RF energy flux to the treated material and thus is generally used only on low setting. This reduces the peak voltage to approximately 2000 V. Operations under these conditions allows continuous RF to be applied without overheating a bed of treated polyamide material.

The RF oven was provided with a movable transport belt to move a bed of material through the active RF zone. This zone, which was determined by the shape and size of the driven electrodes, measured 24" wide in the center zone, with "wings" (i.e., beveled areas) added to the electrode ends to provide a more uniform field shape at the edges. A total of four electrodes delivered the RF energy to the material in the bed. A metal plate below the belt supported the belt and provided the ground electrode. While the electrodes were independently adjustable for height, they were electrically in common and could not be isolated from each other. Height adjustments could be made from 5" to 8.25" when unimpeded. With the box in place, the height variation could only be from 6" to 8.25". Belt speed could be controlled from 1" per minute up to several feet per minute. At the front end of the belt (i.e, the location of the belt entering the oven), a doctor blade was provided to form a shaped bed from chip mass on the belt. At the back end of the belt (i.e., a location of the belt deeper in the oven than the front end), was provided an infrared thermometer and, outside the RF field area, an electromechanical thermocouple. However, for all the runs made with the box, these devices were unable to measure the temperature of the material inside. For those runs, temperature was measured using a four-channel fiber optic temperature probe system, which can be operated within an RF field, (provided by Luxtron Co., Santa Clara, Calif.). In some runs only two or three of the channels were used, as the situation dictated.

When the box was utilized, the belt was allowed to remain stationary.

Example 1

A typical SSP only run was conducted in the box as described. The starting material was a homopolymer of PA-6 with a starting FAV value of 73. Table 1 shows the increase in viscosity utilizing the above-described exemplary reaction parameters. Bed depth was 0.5 inch.

TABLE 1

| Sample # | RF time, min. | Total time, min. | Ave. SS., ° C. | FAV |
|---|---|---|---|---|
| 1207A | 107 | 120 | 192 | 106 |
| 1207B | 174:40 | 240 | 193 | 136 |
| 1207C | 306 | 380 | 196 | 160 (Retest = 154) |
| 1208A (Same material, continuation) | 102/408 | 120/500 | 194 | 138 |
| 1208B | 189/494 | 240/620 | 194 | 180, 182 (164 on cool side of box) |

During this run, the average ΔFAV/hr=10.5

Example 2

Using the same homopolymer, FAV value of 73 at start, increase bed depth to 2 inches.

TABLE 2

| Sample # | RF time, min. | Total time, min. | Ave. SS., ° C. | FAV |
|---|---|---|---|---|
| 1215A | 56 | 56 | 196 | 77.5 |
| 1215B | 270 | 270 | 192–4 | 126 |
| 1215C | 360 | 360 | 192–44 | 150.8 |

During this run, the average ΔFAV/hr=13.0

Example 3

Using a copolymer consisting of 85% PA-6, 15% PA-66, initial FAV value 103.

TABLE 3

| Sample # | Total time, min. | Ave. SS temp. ° C. | FAV |
|---|---|---|---|
| 1216A | 60 | 150 | 103 |
| 1216B | 180 | 180 | 113.5 |
| 1216C | 300 | 180 | 131.4 |

During this run, the average ΔFAV/hr=3.56. This low value compared to Examples 1 and 2 is probably due to the lower operating temperature and the fact that the nylon is of different composition.

Example 4

Using unleached homopolymer. Each sample was run in continuous RF energy using the 60% taps on the RF power supply transformers resulting in RF voltages of 3.5 kV. The results are shown in Table 4. CPL was released as vapor and collected by freezing of the vapor directly on the RF electrodes. Percentages of CPL lost were determined by weight loss of the nylon samples, which were weighed before and after the run. The CPL lost represents the amount of CPL lost, relative to the initial amount of 15.13%.

NOTE: This material, as supplied in unleached form has an FAV value of 35. Exhaustive leaching in a Soxlet extractor, followed by drying at 100° C. in a vacuum oven yielded material having an FAV value of 49. The exhaustive extraction removed 15.3% of the original weight as extractables.

TABLE 4

| Sample # | Total time, min. | Ave. SS. Temp. °C. | % CPL Lost | FAV |
|---|---|---|---|---|
| 12099A | 180 | 160 | 29% | 51.5 |
| 12299B | 300 | 180 | 44% | 52.5 |

The slow increase of FAV during the removal of CPL by evaporation agrees well with the known but not well understood fact that PA-6 must generally be extractable-free to achieve maximum SSP reaction rates (see Nylon Plastics, M. Kohan ed., John Wiley and Sons, NY, 1973, p. 20).

Example 5

This example illustrates the influence of the bulk dimension of the polymeric body on the rate of the SSP reaction. A sample of Nylon-6, Capron™ supplied by AlliedSignal, with FAV 73, in the form of nearly cylindrical chips of approximately 0.07 in. diameter and 0.09 in. long was subjected to SSP for 6 hours at 195–200° C. in the test box as previously described. The nitrogen flow rate was 20 standard cubic ft. per hour. The resulting product had FAV of 142, a ΔFAV of 11.5 per hour. The final FAV was not changed significantly by increasing the nitrogen flow rate to 40 standard cubic ft. per hour.

A sample of AlliedSignal Nylon 6 tire cord in the form of unstretched yarn, FAV 54, denier approximately 6300, was formed into a loose coil and placed in the RF for SSP at 200° C., with nitrogen flow of 40 standard cubic ft. per hour. In three hours the tire cord yarn had reached FAV 194, for a ΔFAV of approximately 47 per hour. This difference in SSP rate is interpreted to indicate that the rate of escape of the product water is significantly greater when the water has a, shorter path to the surface of the polymeric body. This greater escape rate of water correlates strongly with increased rate of SSP, when other variables are kept constant.

Example 6

This example illustrates that the rate of the SSP reaction can be significantly dependent on the content of additives such as lubricants. For example, Zytel 101™ is commonly supplied as Zytel 101L, lubricated by addition of a small amount of calcium stearate, and as Zytel 101™, in which no additives are present. Both are Nylon-66, and both have FAV approximately 50 as supplied. Samples of each were subjected to SSP under essentially identical conditions. The temperature of each run was 235° C., under nitrogen flow rates of 60 standard cubic ft. per hr. The Zytel 101L reached FAV 200 during a 12 hour run, giving a ΔFAV of 12.5 per hour. By contrast, the Zytel 101 reached FAV 1646 in a 6 hour run, giving ΔFAV of 266 per hour. This is the highest value of ΔFAV observed to date. The retardation of the rate in the presence of stearate can be rationalized readily by assuming that some of the free amino ends of the polyamide chain undergo an amidation reaction with the free stearate rather than by amidation via the chain-lengthening condensation reaction. This reduction in the number of free amino ends reduces the rate of the SSP reaction significantly. In order to lengthen the chain further, a transamidation reaction to replace the stearate "cap" with a carboxylic group from another chain must take place. This transamidation reaction appears to be significantly slower than the simpler ordinary amidation which joins two shorter chains together in the condensation reaction.

Example 7

This example illustrates that both rapid growth in molecular weight and in physical properties are possible by the use of the methods of this invention. A sample of thin nylon-6,6 rod (perhaps better described as an undrawn monofilament) with a diameter of 0.050 in. and FAV 227 as supplied had tensile strength of 7735 psi. This material was treated with RF at a temperature of 235° C. and with a nitrogen flow of 40 standard cubic ft. per hour, for a period of 6 hours. After cooling under nitrogen overnight, FAV 1235 and tensile strength of 13,800 psi were observed.

Example 8

This example illustrates that the instant invention is applicable to materials generally of the class of condensation polymers and not restricted to the class of polyamides (nylons).

A sample of polyurethane-polyester blend material supplied under the trade name of Texin 255™, from Bayer Corporation was obtained. The material had an elongation of 325% and a breaking tensile strength of 3760 psi. Because of the solubility profile of this polymer blend, no FAV could be determined for the material. The material was treated by the method of the instant invention, at a temperature of 145° C. for 6 hrs, and nitrogen flow of 40 standard cubic ft. per hr. At the end of this period, the cooled material was determined to have a breaking tensile strength of 5900 psi and an elongation at break of 388%. Another sample of the treated material was allowed to equilibrate with the atmosphere for 24 hours, and showed essentially identical values.

Exemplary apparatuses which can be utilized in accordance with methods of the present invention for radiation treatment (such as, for example, RF radiation treatment) of polymeric materials are described with reference to FIGS. 2–15. A first embodiment apparatus 10 is described with reference to FIG. 2. Apparatus 10 comprises a feed material inlet port 12, a first reaction zone 14, a second reaction zone 16, and an outlet port 18. Inlet port 12 (which can also be referred to as a feed port) is configured to enable a feed material 20 (shown as a granular material, but is to be understood that feed material 20 can also comprise other forms such as, for example, a liquid or viscous melt). A feed material flow path 15 extends from inlet port 12 through reaction zones 14 and 16, and out of outlet port 18. Apparatus 10 is preferably aligned such that gravity still feed material 20 through the apparatus and out of flow port 18. Specifically, if the gravitational force of the earth is considered to define a vertically downward direction 22, apparatus 10 is aligned so that feed material 20 travels downwardly along the flow path from inlet port 12, through first and second reaction zones 14 and 16, and out of outlet port 18.

Reaction zones 14 and 16 are preferably configured for applying RF radiation, and more preferably configured for applying non-microwave RF radiation. Apparatus 10 can be configured to, for example, provide RF treatment to a nylon feed material during solid state polymerization of the feed material. Accordingly, feed material 12 can comprise chips of nylon-6. Alternatively, apparatus 10 can be urged to form nylon from caprolactam, and to treat reactants with energy during one or more of the reactions described in the "Background" section as reactions I–VII. Accordingly, feed material 20 can enter apparatus 10 as a liquid predominantly comprising caprolactam, and be converted to polymer within the apparatus. In yet another embodiment, feed material 20 can enter apparatus 10 as a substantially dry material, such as, far example, a material leaving step 7 of the process described in FIG. 1, and the apparatus of FIG. 10 can be utilized for solid state polymerization of the substantially dry feed material.

Figure 3:
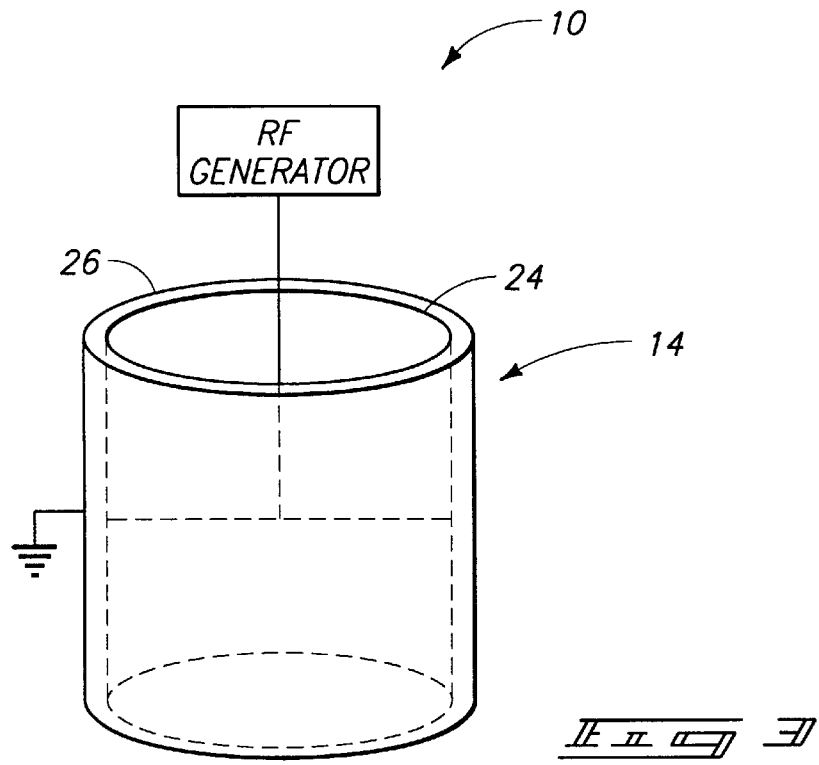
FIG. 3 is a diagrammatic, fragmentary view of a portion of the FIG. 2 apparatus formed in accordance with a first embodiment of the present invention.

In the shown embodiment, first reaction zone 14 comprises an RF applicator (which can also be referred to herein as an RF generator) which is formed from a pair of concentric electrodes 24 and 26. Such RF applicator is shown in FIG. 3 in isolation from the rest of apparatus 10. One of electrodes 24 and 26 is powered and the other is grounded so that an RF field is generated between electrodes 24 and 26. Feed material 20 passes between electrodes 24 and 26, and accordingly passes within the RF field generated by electrodes 24 and 26. In the shown embodiment, electrodes 24 and 26 are in the shape of cylinders, and powered electrode 24 is surrounded by grounded electrode 26. In other embodiments (not shown) the grounded electrode can be inward of the powered electrode.

Powered electrode 24 can be powered by a conventional RF generator. Preferably, electrode 24 is directly connected to an output the generator, and electrode 26 is connected to ground to complete a circuit with the grounded side of the generator. The RF generator is preferably connected to electrode 24 by a plurality of inputs (not shown) so that a field imparted by the generator is substantially equal over a surface of electrode 24. The electrical input points are preferably arranged such that a distance between them and the edges of the electrode are not an integer multiple of a wavelength of the RF field, and the height and circumference of a cylinder comprising electrodes 24 and 26 is preferably similarly restricted. Accordingly, the RF energy will create a field of alternating current in an annulus between the inner electrode 24 and outer electrode 26 which is substantially constant in amplitude.

Second reaction zone 16 comprises a pair of concentric cylindrical electrodes 29 and 30 which together comprise an RF generator similar to that described above relative to the generator formed from electrodes 24 and 26.

Feed material 20 is fed to first reaction zone 14 through a passageway 32 formed over a surface of an inner conical-shape 34 and under a surface of an outer conical-shape 36. Feed material 20 exits reaction zone 14 between surfaces of conical-shapes 38 and 40. Conical-shapes 34, 36, 38 and 40 are preferably RF shielded, and can comprise, for example, metal, or dielectric materials surrounded by metal RF shielding.

Feed material 20 is fed into and out of second reaction zone 16 between pairs of conical-shapes 42, 44, 46 and 48, which preferably comprise RF-shielded materials of the type described above relative to shapes 34, 36, 38 and 40.

The RF shielding of structures 34, 36, 42, 44, 46 and 48 can be accomplished by other structures than those described above, such as, for example, by appropriate baffles between the reaction zones.

Ports 50, 52, 54 and 56 extend through an outer wall of apparatus 10 and into a passageway comprising feed material 20. The ports enable one or both of sweep gas and vacuum to be applied within the passageway comprising feed material 20. If a sweep gas is provided, such can flow either in a direction along the flow path of feed material 20, or in a direction counter-current to the flow path of feed material 20. In applications in which apparatus 10 is utilized for solid state polymerization of polyamide materials, preferably both vacuum and sweep gas are applied within the passageway comprising feed material 20, and preferably the sweep gas is inert relative to a reaction with the polyamide material. Suitable sweep gases can comprise, for example, nitrogen or argon, and preferably do not comprise oxygen.

The sweep gas can be passed through an exchange system (not shown) to extract CPL or other unreacted components from the sweep gas, and subsequently the sweep gas can be recycled to apparatus 10. Also, a sweep gas entering through ports 50, 52, 54 and 56 can be passed through a plurality of holes into different regions of the passageway comprising feed material 20. Such holes can constitute a ring of ports extending through surfaces of conical shapes 34, 38, 42 and 46, and are indicated by dashed lines 58, 60, 62 and 64.

Baffles (not shown) can be included along flow path 15 (for instance, within passageway 32) to enhance exchange of volatile components from a feed material to a sweep gas. Baffles can also be provided in reaction zones 14 and 16 to mix polymer as it passes through the zones, as well as to move polymer from inner electrodes to outer electrodes and vice versa.

Apparatus 10 comprises airlocks 70, 72 and 74 which enable a sweep gas utilized in first reaction zone 14 to be prevented from mixing with a sweep gas utilized in second reaction zone 16, and which further prevent mixing of sweep gasses with the air surrounding apparatus 10. Although rotary airlocks are shown, other suitable airlocks can be utilized. It is noted that in some embodiments (not shown) one or more of airlocks 70, 72 and 74 can be eliminated so that a common sweep gas can move through both of reaction zones 14 and 16. However, it can be advantageous to utilize a separate sweep gas in reaction zone 14 than that utilized in reaction zone 16, particularly, if one of the reaction zones is exuding a larger amount of volatile contaminants than another of the reaction zones. In such circumstances, the separation of the sweep gas between the two reaction zones can avoid saturation of the sweep gas with volatile components from one reaction zone and subsequent migration of the volatile components from the saturated sweep gas into feed material present in the second reaction zone.

Although apparatus 10 is shown comprising only two reaction zones, it is to be understood that the apparatus can comprise more than two reaction zones, and further that the apparatus could comprise only one reaction zone. In a particular embodiment, apparatus 10 comprises two reaction zones, and one of the reaction zones utilizes a higher RF power than the other of the reaction zones. Apparatus 10 can thus be utilized for solid state polymerization of a nylon-6 feed material. Specifically, the first reaction zone 14 can be provided to be at the higher power of RF energy and can be utilized to substantially dry the nylon-6 feed material and raise it to an appropriate temperature for SSP. After the material is substantially dried, it can be passed to second reaction zone 16 and subjected to lower power RF radiation to enhance polymerization within the material. Preferably, the material will enter reaction zone 16 with a first FAV value, and exit reaction zone with an FAV value which is at least twice as large as the first FAV value, more preferably which is at least three times larger than the first FAV value, and even more preferably which is at least four times larger than the first FAV value.

A polymer moving along flow path 15 is subjected to RF radiation in reaction zones 14 and 16 which will heat polar materials within the polymer, directly, and which will heat non-polar areas within the polymer through conduction from heated polar molecules. A temperature of the polymer can be monitored as it flows along path 15 by, for example, fiberoptic thermometry, and RF power levels adjusted to keep the temperature at a desired level. Methodology for adjusting RF power levels vary with the type of RF generator used. If an amplifier-based generator is used, RF power can be adjusted by simply lowering a gain of the amplifier. In contrast, if an oscillator-based generator is used, a plate voltage can be changed by changing the input voltage of the generator within the limits of the design.

Referring to FIG. 3, it is noted that center electrode 24 has a smaller diameter than outer electrode 26. This can cause an RF field at a surface of inner electrode 24 to be greater than a field along a surface of outer electrode 26. If a spacing between electrodes 24 and 26 is kept constant, the magnitude of this difference will decrease as the diameters of the electrodes increase. For instance, if a spacing between the electrodes is 10 centimeters, an outer electrode radius of greater than or equal to about 2 meters will result in a relatively constant field at the surfaces of electrodes 24 and 26.

A level of desired field homogeneity can vary depending on the type of polymer treated, its residence time between electrodes 24 and 26, an amount of mixing of the polymer while it is between the electrodes, and the volume and temperature of a sweep gas. The sweep gas can be particularly influential, as mixing and heat transfer by the sweep gas can lower a temperature difference between the inner and outer electrodes. A typical desired goal for an SSP unit is a temperature difference of no more than a few degrees centigrade within the portion of flow path 15 passing between electrodes 24 and 26. A method of accomplishing such goal can be to utilize electrodes having a diameter of greater than or equal to about 4 meters, and to further utilize a sweep gas.

Apparatus 10 effectively utilizes two stages of RF treatment, with, a first stage occurring in first reaction zone 14, and a second stage occurring in second reaction zone 16. In applications wherein apparatus 10 is utilized to enhance solid state polymerization, the first stage of RF heating (i.e., zone 14) can be run at a higher power than the second stage (i.e., zone 16). Because of the higher power of the first stage, its size can be smaller relative to the second stage so that a residence time of polymer within the first stage is shorter. The stages can be separated by an airlock 72, as shown, if the two stages are to be run with different volumes, temperatures or humidities of sweep gas. Alternatively, the sweep gas flows can be isolated from one another by other mechanisms. In yet another alternative embodiments, the two stages can be swept continuously with a sweep gas which enters the bottom of the lower stage and exits at the top of the upper stage. Further, apparatus 10 can be run with a vacuum applied to passageway 15, or under reduced pressure with a small volume of sweep gas moving through passageway 15.

Although apparatus 10 comprises two stages, additional stages can be incorporated into the apparatus. It can be advantageous to utilize more than two RF generators in order to reduce disparity of power levels between adjacent treatment zones. Further, a section of apparatus 10 can comprise more than one electrode set in the area between the top of conical portions 34 and 36, as well as between conical portions 38 and 40, conical portions 42 and 44, and conical portions 46 and 48, provided that the conical portions define electrode sets. Such electrode sets can be separated by cylinders of dielectric material to isolate the sections electrically from other RF generating portions of apparatus 10. The isolation zones could also contain baffles and restrictions to both act as RF chokes and to provide mixing to the polymer as it moves down flow path 15. Sweep gas inlets and outlets can also be provided in flow path 15 to allow for different sweep rates in different zones. Further, extra sweep gas inlets and outlets can be provided within passageway 15 by simply cutting holes through electrode cylinders and supplying appropriate ductwork.

After feed material 20 passes through airlock 74 and out of apparatus 10, it can pass to a polymer chip cooler (not shown) for cooling to an appropriate temperature for subsequent handling and processing. Such cooler can cool the chips via a sweep gas which is inert relative to reaction with the polymer at the temperature at which the polymer exits from apparatus 10.

It is noted that if a sweep gas is utilized with apparatus 10 in conjunction with an SSP process, the gas is preferably recycled to reduce costs. Further, if air is utilized as a sweep gas, it can be stripped of vapors prior to return to the environment for environmental safety reasons. Apparatus 10 can therefore be utilized in conjunction with a sweep gas cleaning unit (not shown). In situations in which the vaporized material extracted by the sweep gas is water, the cleaning unit can simply be a disk and bed. It can be desirable to cool the sweep gas before it enters the bed, and then subsequently to reheat the gas, before its reentry into flow path 15. The reheating can be accomplished, for example, by having a gas exiting a cleaning unit by a cooling gas in the first stage of the polymer chip cooler after the polymer leaves the SSP unit. Such gas could run countercurrent to the flow of polymer until it is at the same temperature as the exiting chips, and the gas would thus be heated by the chips.

If the sweep gas contains vapors other than water, conventional desiccant beds may not be practical if they can be fouled by the other vapors. In such cases, the vapors can be removed from the sweep gas by cooling it below the dew point of the vapors. If the value of the recovered vapors and sweep gas makes it economical to do so, it call be a preferred embodiment to cool the sweep gas to a temperature below the dew point of the contaminating vapors by impinging the gas on evaporation coils of a heat pump. The cooled, vapor-reduced gas can then be reheated by first impinging it on the condenser coils of the heat pump, and then upon the hot polymer in the polymer chip cooler as discussed previously. Vapors can also be condensed out of a sweep gas by other means. If apparatus 10 is utilized to remove caprolactam or other unreacted monomers from a polymer, the sweep gas containing the vapor (or the vapor itself in a vacuum-only unit) can be condensed by contacting the gas/vapor with liquid monomer before it enters the polymerizer.

Figure 2:
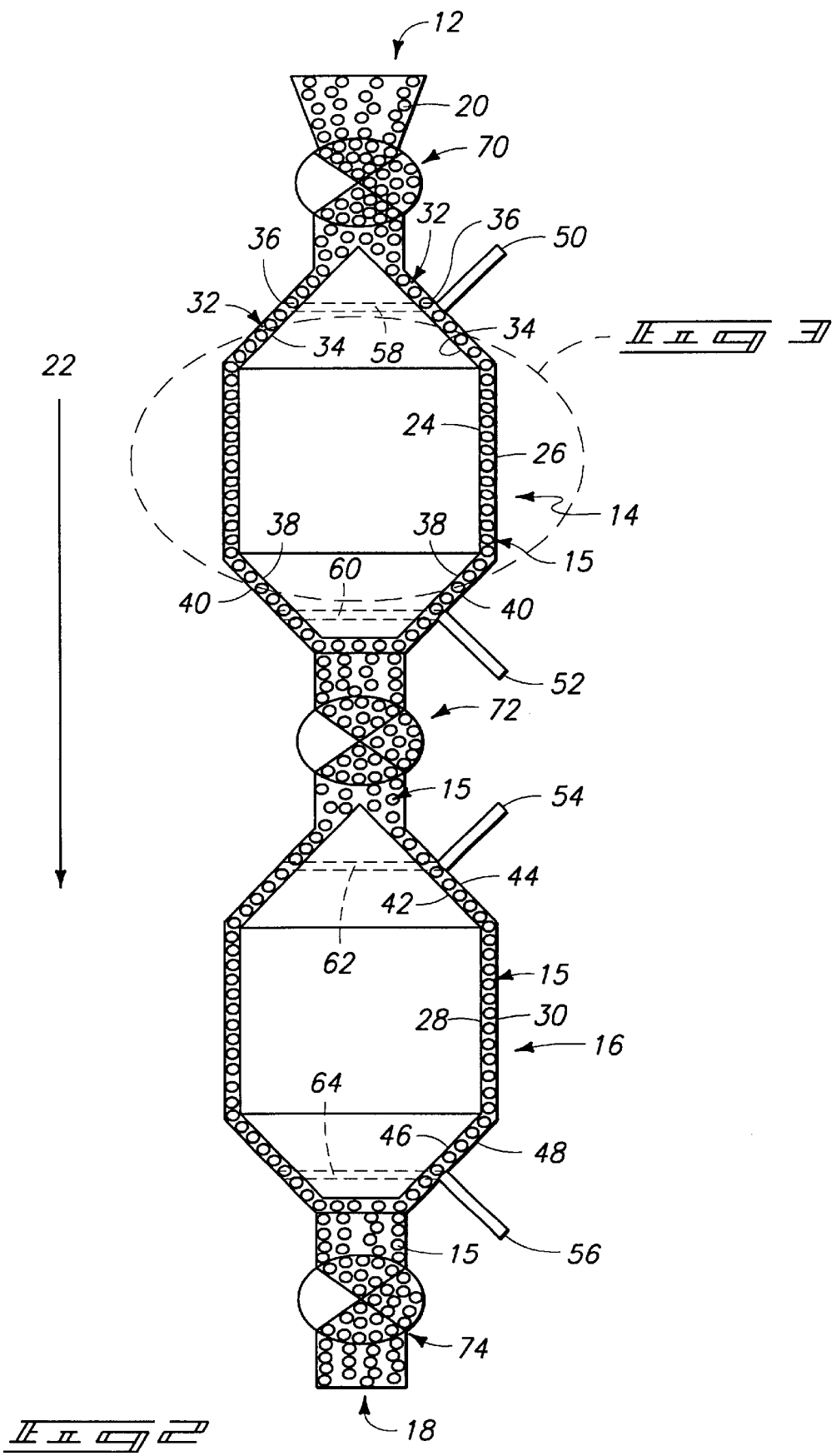
FIG. 2 is a cross-sectional, diagrammatic view of a first embodiment apparatus encompassed by the present invention.

The RF generators utilized for apparatus 10 of FIG. 2 are preferably amplifier-based RF generators, rather than oscillator-based systems, as amplifier-based RF generators can enable power adjustment relative to the shown fixed electrodes. If an oscillator-based system is utilized, then power adjustment will typically be accomplished by changing a space between the electrodes. FIGS. 4–7 illustrate an embodiment of the invention wherein electrode spacing is adjustable to enable incorporation of an oscillator-based RF generator into methodology of the present invention. In referring to FIGS. 4–7, identical numbering will be used as was used above in describing FIGS. 2–3, with the subscript "a" used to indicate structures shown in FIGS. 4–7.

Figure 4:
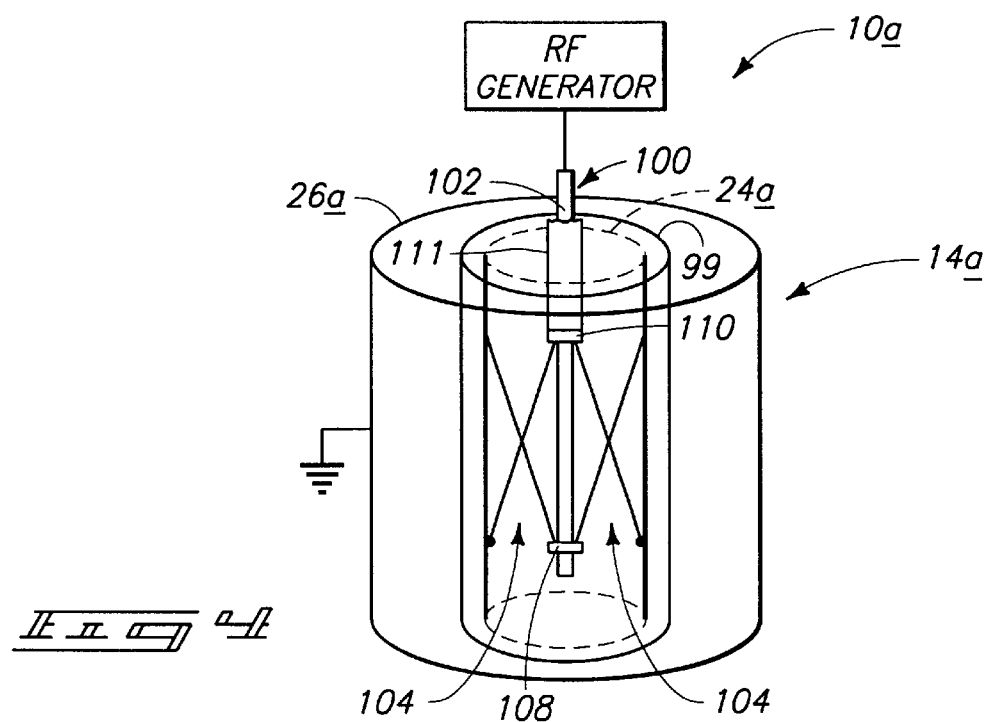
FIG. 4 is a fragmentary, diagrammatic view of a portion of the FIG. 2 apparatus formed in accordance with a second embodiment of the present invention.

Referring first to FIG. 4, reaction zone 14a is shown in an isolated view corresponding to the same view as that shown in FIG. 3 for reaction zone 14. Reaction zone 14a is similar to reaction zone 14 of FIG. 3 in that reaction zone 14a comprises an inner powered electrode 24a, a middle electrode 99, and an outer grounded electrode 26a. In this arrangement, the inner surface of the middle electrode 99 is a retaining wall made of metal, which is electrically isolated and therefore acts as a "floating electrode," which retransmits the RF radiation emanating from the powered electrode. Reaction zone 14a differs from the reaction zone 14 of FIG. 3 in that a surface of inner electrode 24a can be moved relative to a surface of outer electrode 26a to enable a spacing between the electrodes to be varied. It is noted that although the illustrated embodiment shows only one of electrodes 24a and 26a being movable, the invention encompasses other embodiments (not shown) wherein both of the electrodes are movable relative to one another, as well as other embodiments wherein outer electrode 26a is movable relative to inner electrode 24a. A top of inner electrode 24a is shown be a dashed line to indicate that the top is only approximated in FIG. 4. The actual shape of the top of inner electrode 24a can be more clearly understood with reference to FIG. 7, which is described below.

Figure 5:
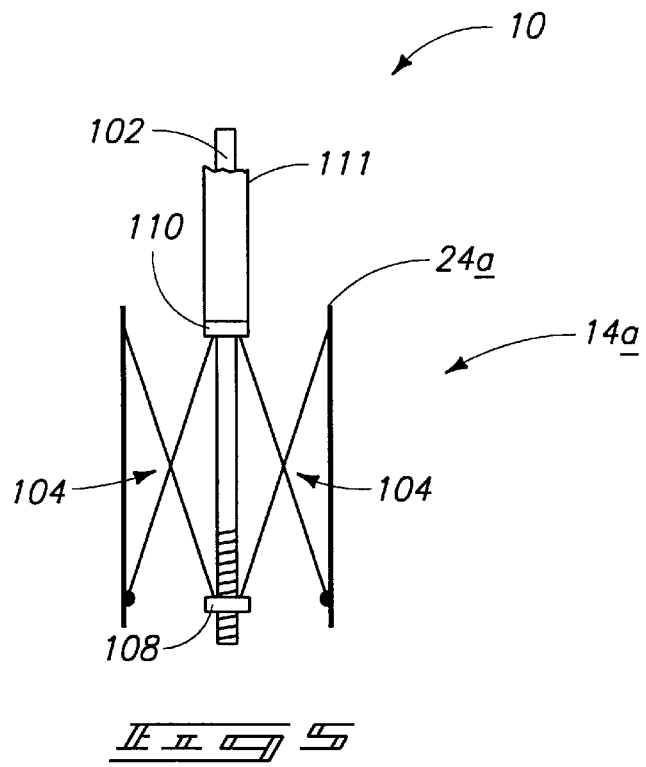
FIG. 5 is a fragmentary view of a portion of the FIG. 4 fragment shown in a first position.
Figure 6:
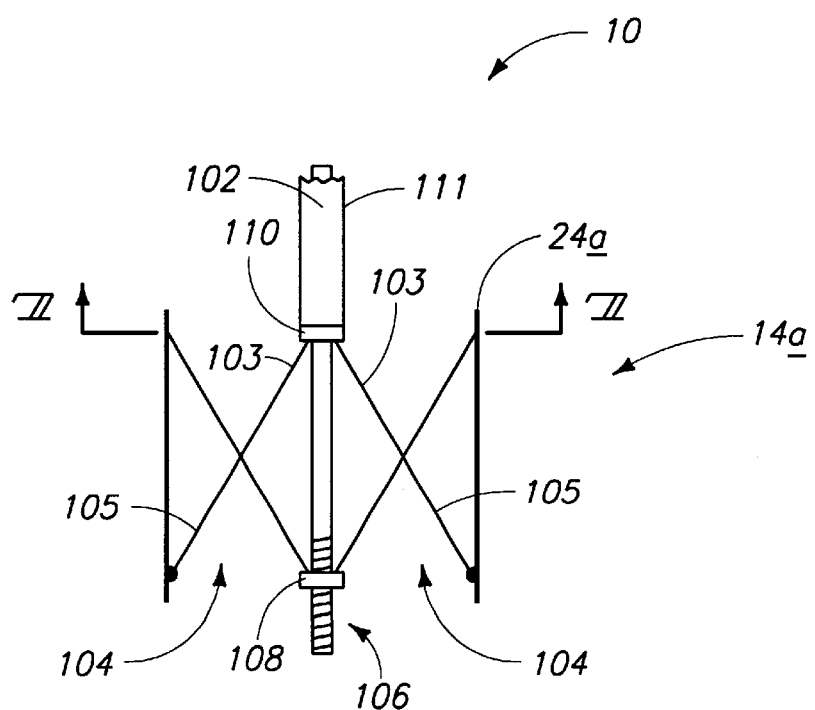
FIG. 6 is a view of the FIG. 5 fragment shown in a second position.

Apparatus 10a comprises a support structure 100 which supports reaction zone 14a. Support structure 100 includes an anchor 102 proximate movable inner electrode 24a. Anchor 102 is illustrated in FIGS. 5 and 6 in isolated cross-sectional view with inner electrode 24a. As shown, anchor 102 is connected to movable electrode 24a through a plurality of scissoring connectors 104. Anchor 102 comprises a threaded section 106. A threaded collar 108 is threadedly engaged with section 106, and a second collar 110 is at a fixed location relative to anchor 102, and constructed such that anchor 102 can be rotated within collar 110. In operation, anchor 102 is rotated to move threaded, collar 108 up and down relative to the collar 110 at a fixed location. Such causes scissoring members 104 to extend or retract movable electrode 24a. FIGS. 5 and 6 show movable electrode 24a in different positions relative to anchor 102, and illustrate how sliding of collar 108 up and down relative to collar 110 can extend or retract movable electrode 24a.

Collar 110 can be held in fixed position relative to anchor 102 through a variety of attachment mechanisms. In the shown embodiment, collar 110 is held in fixed position relative to anchor 102 through utilization of a hollow shaft 111.

Scissoring connectors 104 comprise arms 103 and 105 which pivot relative to collars 108 and 110. FIG. 7 shows a diagrammatic top view of the apparatus portion 14a of FIG. 6 along the line 7—7. Such illustrates movable electrode 24a comprising a plurality of flexible sections 120 joined to arms 103 and 105 through posts 122. In the shown embodiment, electrode 24a comprises eight sections 120, however, it is to be understood that fewer or more than eight sections can be utilized in other embodiments (not shown). Flexible sections 120 can comprise, for example, flexible conductive metal sheets that run the entire length of electrode 24a. Accordingly, the sheets act as electrodes themselves and help equalize a field around a periphery of electrode 24a. If further equalization of the field is desired, shaft 102 can be rotated or oscillated to cause rotation and oscillation of electrode 24a.

RF feed lines (not shown) can be attached directly to individual sheets 120 in a quantity appropriate for desired field uniformity. The movement mechanism associated with electrode 24a (i.e., anchor 102, and arms 103 and 105) can be electrically isolated from sheets 120 by a layer of dielectric material between electrically conductive sheets 120 and the movement mechanism. Also, portions of the mechanism which extend above or below either electrode 24a or electrode 26a can be RF shielded and also suitably electrically isolated.

Arms 103 and 105 preferably slide upwards or downwards relative to metal sheets 120. Such can be accomplished by fixing a track to sheets 120 which allows rotation and vertical translation, but which preferably prevents horizontal translation of an end of a support arm relative to the tracks.

As described above, movement of electrode 24a is accomplished by rotation of shaft 102a. Specifically, rotation of shaft 102 causes vertical movement of collar 108 relative to fixed collar 110, which causes electrode 24a to move either inward or outward. Movement of collar 108 upwards causes electrode 24a to move outward, and movement of collar 108 downwards causes electrode 24a to move inward. It is noted that as the collar 108 moves upward, the outer ends of support arms 105 move downward. This can cause electrode 24a to move vertically relative to center shaft 102 and outer electrode 26a. Preferably, a mechanism is provided whereby shaft 102 can be moved vertically to maintain vertical alignment between inner electrode 24a and outer electrode 26a as electrode 24a is moved horizontally inward or outward. Alternatively, vertical movement of electrode 24a could be effected by a variable-pitch thread on a section of center shaft 102 extending below a lower edge of outer electrode 26a. Such variable-pitch thread could be configured to move anchor 102, and accordingly maintain inner electrode 24a at a proper vertical location relative to outer electrode 26a when anchor 102 is rotated to move electrode 24a either inwardly or outwardly.

It is noted that the invention encompasses embodiments wherein a pitch of inner electrode 24a relative to outer electrode 26a can be changed from parallel. Such can be accomplished by including a mechanism on one or both of collars 108 and 110 which continuously adjust a distance between pivot points of rods 103 and 105 relative to the centers of the collars. The invention also encompasses embodiments wherein the array of flexible electrode sheets 120 comprises one or more sets of electrode sheets that can be independently varied relative to power and RF frequency, or that can be independently positioned relative to other electrode sheets. The independent positioning can be accomplished with either electric or hydraulic linear actuators which move the collars up and down, rather than utilization of threaded collars and shafts. Additional mechanisms which could be utilized for moving electrode sheets 120 inwards and outwards, or for changing the, pitch of particular electrode sheets, could include, for example, utilization of a movable and possibly rotating array of electrode sheets arranged radially within outer electrode 26a.

In the embodiment shown in FIG. 4, electrode 26a is grounded. However, it is to be understood that electrode 26a could be powered and electrode 24a grounded, or that both electrodes 26a and 24a could be powered. Further, one of the electrodes could be powered and the other one electrically floated.

U.S. Pat. No. 5,420,404 describes an apparatus for RF drying of particulates that utilizes concentric electrodes. A difference between the present invention and that disclosed in U.S. Pat. No. 5,420,404 is in the way that RF energy is applied to the inner electrode of the present invention. Specifically, U.S. Pat. No. 5,420,404 indicates that the center electrode is designed specifically to be equal in length to one-quarter of the wavelength of the frequency that the electromagnetic field oscillates at. The center electrode is meaning that it determines the frequency of oscillation. Due to this arrangement, the amplitude of the electromagnetic field that is applied to the polymer decreases sinusoidally as it moves toward the grounded end. While this arrangement may be practical for drying, it is less than optimal for SSP, as it would be difficult, if not impossible, to keep all of the polymer that is between the inner and outer electrodes at a common temperature unless one utilized a very large amount of sweep gas. Such large amount of sweep gas would likely be uneconomical.

FIG. 8 illustrates a modification to the process of U.S. Pat. No. 5,420,404 that helps overcome the decrease of electromagnetic field applied to a polymer in the apparatus. FIG. 8 shows a construction 130 comprising a grounded outer wall 131, a grounded inner electrode 136, a retaining inner wall 132 and an annulus 134 between the walls 131 and 132. Construction 130 further comprises an adjustable capacitive coupler 138 electrically connected to an RF generator.

In the design of U.S. Pat. No. 5,420,404, the center electrode transmits electromagnetic energy outwards independently of the contents between the center and outer electrodes. Accordingly, the intensity of the field varies in inverse proportion to the square of the distance from the electrode. Although the amplitude of the field decreases sinusoidally as one gets closer to the grounded end of the electrode, a stronger field could be experienced at the grounded end than at the powered end if an electrode were sufficiently closer to the grounded end at a location proximate the grounded end than it was near the powered end at a location proximate the powered end. Thus, an electrode which varied in diameter, getting exponentially wider at the grounded end, could possibly be coupled with a spacing between electrodes that gets progressively narrower near the grounded end, and such would tend to equalize the field strength experienced by a polymer between the electrodes. The shape of the electrodes could be determined by keeping a product of sin(y) and $1/r^2$ constant, and the arc length of the electrode surface would be equal to one-quarter of the desired RF wavelength. This modification can be utilized in conjunction with other aspects and devices described above relative to apparatus 10 of FIG. 2, including, for example, sweep gases, vacuum, heating stages, etc.

Figure 9:
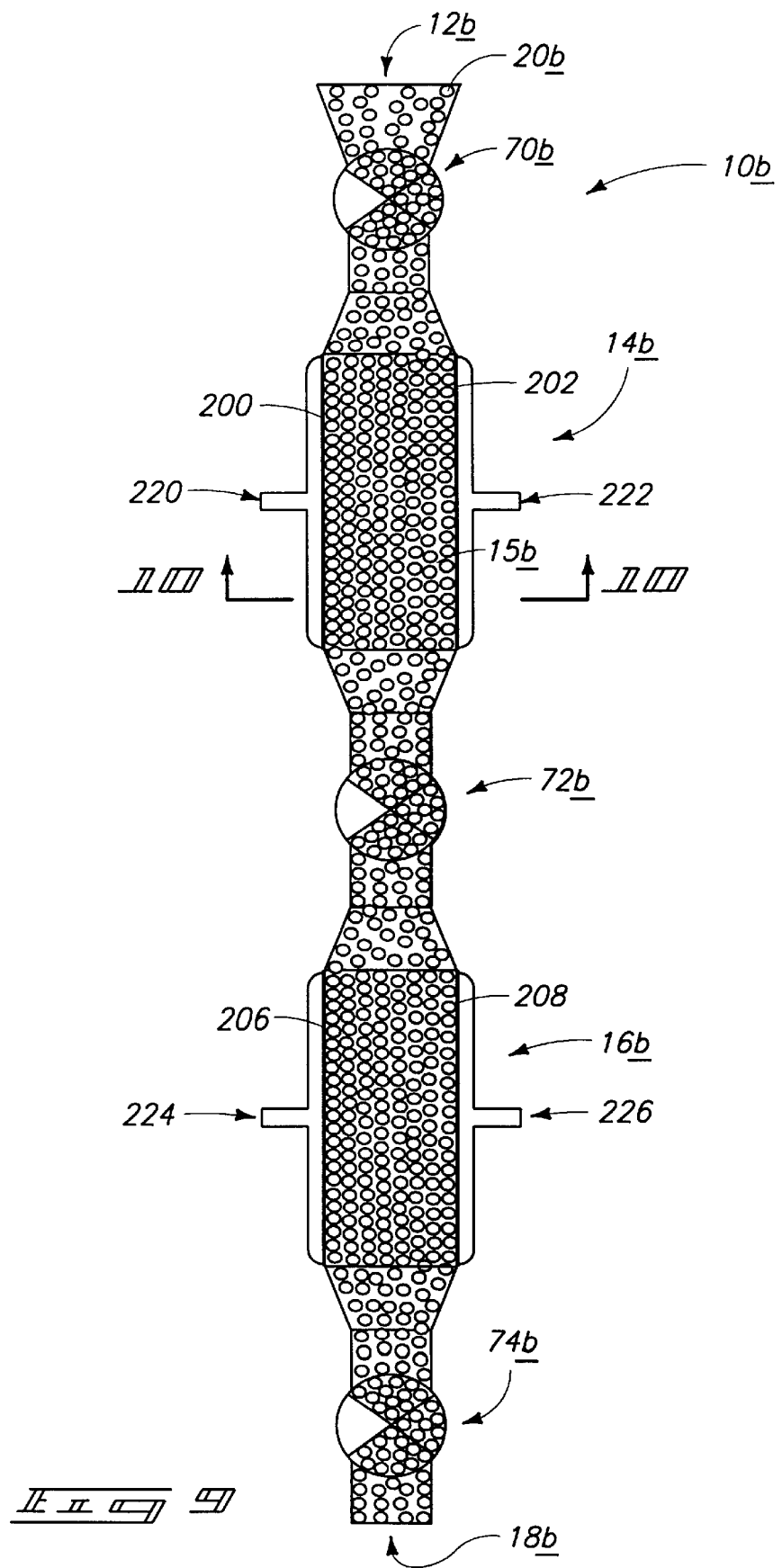
FIG. 9 is a diagrammatic, cross-sectional view of another embodiment apparatus of the present invention.
Figure 10:
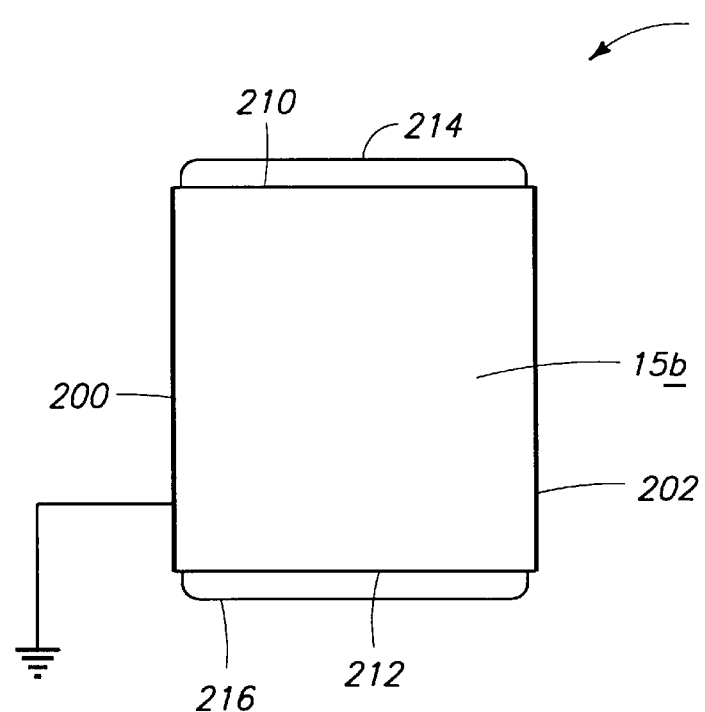
FIG. 10 is a cross-sectional view along the line 10—10 of the FIG. 9 apparatus.

FIGS. 9 and 10 illustrate another embodiment of the present invention. In referring to FIGS. 9 and 10, similar numbering will be used as was utilized above in describing the apparatus of FIG. 2, with the subscript "b" used to identify features shown in the apparatus of FIGS. 9 and 10.

Referring first to FIG. 9, an apparatus 10$b$ comprises an inlet port 12$b$ and an outlet port 18$b$, and comprises RF frequency treatment zones 14$b$ and 16$b$ between inlet port 12$b$ and outlet port 18$b$. Apparatus 10$b$ further comprises airlocks 70$b$, 72$b$ and 74$b$. A feed material 20$b$ is shown passing through apparatus 10$b$ and being treated in zones 14$b$ and 16$b$.

A difference between apparatus 10$b$ of FIG. 9 and apparatus 10 of FIG. 2 is that apparatus 10$b$ utilizes parallel electrode plates in zones 14$b$ and 16$b$, rather than concentric cylindrical electrodes. More specifically, apparatus 10$b$ comprises parallel electrode plates 200 and 202 in reaction zone 14$b$, and parallel electrode plates 206 and 208 in reaction zone 16$b$. One of electrode plates 200 and 202 is preferably powered by an RF generator, and the other is preferably grounded. Further, one of electrodes 206 and 208 is preferably powered by an RF generator, and the other is preferably grounded.

Apparatus 10$b$ comprises a feed material flow path 15$b$ which extends between electrode plates 200 and 202, and also between electrode plates 206 and 208.

FIG. 10 illustrates a cross-sectional view of an isolated portion of apparatus 10$b$ along line 10—10. Such illustrates that passageway 15$b$ actually comprises a rectangular cross-section within zone 14$b$. The rectangular cross-sectional shape comprises a pair of opposing sides defined by electrodes 200 and 202, and another pair of opposing sides defined by dielectric material plates 210 and 212. Such dielectric material plates can comprise, for example, G7 or quartz.

Dielectric material plates 210 and 212 can be considered dielectric spacers between electrodes 200 and 202. The rectangular shape defined by plates 200, 202, 210 and 212 defines an interior region which comprises feed material passageway 15$b$. Further, the rectangular cross-sectional shape defines an exterior region which is on opposing surfaces of plates 200, 202, 210 and 212 from interior region 15$b$. Gas ducts (or plenums) 214 and 216 are provided along the exterior regions of walls 210 and 212 and enable gas flow to be directed along an exterior surface of such walls.

Although the gas ducts are shown provided along both of walls 210 and 212, it is to be understood that the invention encompasses other embodiments (not shown) wherein a gas duct is provided along only one of the walls, or along neither of the walls, or along one or both of electrode plates 200 and 202. Also, although the shown embodiment shows a single gas duct formed along substantially an entirety of an exterior surface of a dielectric material wall (either wall 210 or 212), it is to be understood that the invention encompasses other embodiments (not shown) wherein a plurality of ducts are formed along the exterior surface of a single wall.

Preferably, walls 210 and 212 are perforated to enable gas exchange between the gas flowing through ducts 214 and 216 and the feed material flow path 15$b$. Gas flowing in ducts 214 and 216 can thus constitute a sweep gag flowed against feed material within passageway 15$b$. Further, vacuum can be applied to one or both of ducts 214 and 216 to reduce a pressure within passageway 15$b$.

It is noted that FIG. 9 illustrates ports 220 and 222 which can be utilized for providing gas and/or vacuum into gas ducts 214 and 216 It is also noted that FIG. 9 illustrates additional ports 224 and 226 which can be utilized for providing gas and/or vacuum to other gas ducts associated with reaction zone 16$b$.

Figure 11:
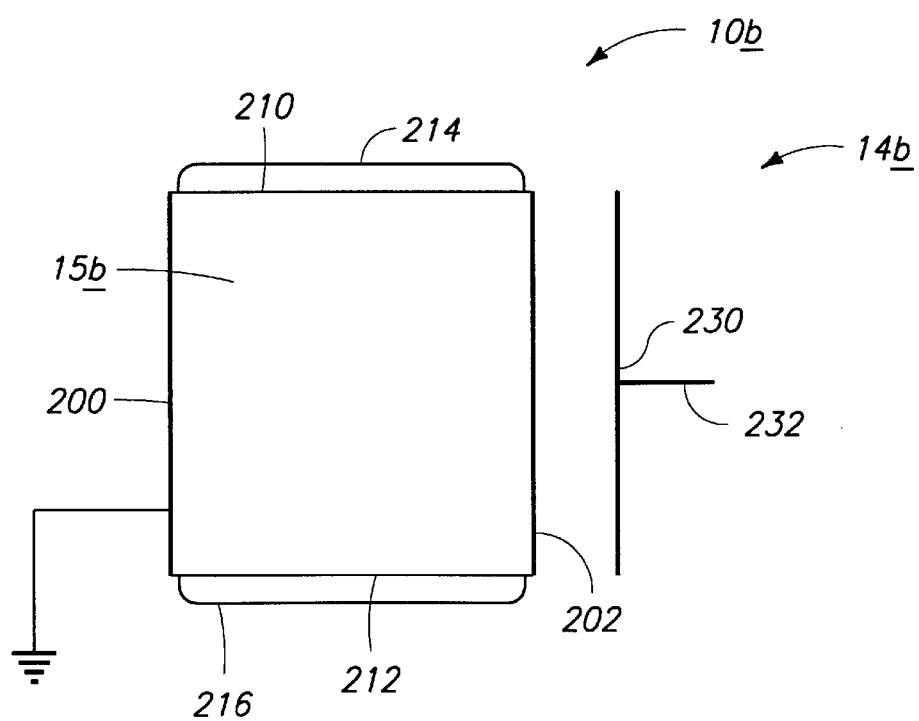
FIG. 11 is a view of a portion of a second embodiment apparatus of FIG. 9, and shown along the same line as that of FIG. 10.

A power level of an electrode in reaction zone 14$b$ or 16$b$ can be controlled through either control of the output of an RF generator, or by constructing the "powered" electrode as a floating electrode powered through an adjustable third electrode. FIG. 11 illustrates an embodiment of reaction zone 14$b$ which utilizes a powered third electrode 230. In describing FIG. 11, identical numbering will be used as was used above in describing FIG. 10.

FIG. 11 shows an identical cross-sectional view as FIG. 10, and is identical in all respects to FIG. 10, except for the use of a third electrode to power electrode 202 rather than using direct coupling to an RF generator. Powered electrode 230 is connected to a support structure 232 which enables electrode 230 to be moved relative to electrode plate 202, and thus enables a power of electrode plate 202 to be controlled. Specifically, a degree of coupling between powered electrode 230 and floating electrode 202 varies with a distance between electrodes 230 and 202.

It is noted that either of the arrangements of FIGS. 10 and 11 could be accomplished by having passageway 15b defined by (i.e., surrounded by) dielectric material, and having such dielectric material placed inside of the rectangular cross-sectional shape shown in FIGS. 10 and 11. Alternatively, passageway 15 could be defined by (i.e., surrounded by) walls constructed of isolated metal, or a combination of isolated metal walls and dielectric material walls, and the isolated metal and/or dielectric material could be placed inside of the rectangular cross-sectional shape shown in FIGS. 10 and 11. In constructions in which passageway 15 is defined by materials inserted within the rectangular cross-sectional shape shown in FIGS. 10 and 11, feed material passing through passageway 15b would not actually contact electrodes 200 and 202. Instead, the feed material would be spaced from such electrodes by the dielectric or electrically isolated materials.

It is also noted that although sweep gases could flow crosswise relative to passageway 15b (i.e., horizontally from port 220 to port 222), the invention encompasses other embodiments wherein the ports could be arranged such that sweep gas flowed lengthwise within passageway 15b.

Figure 12:
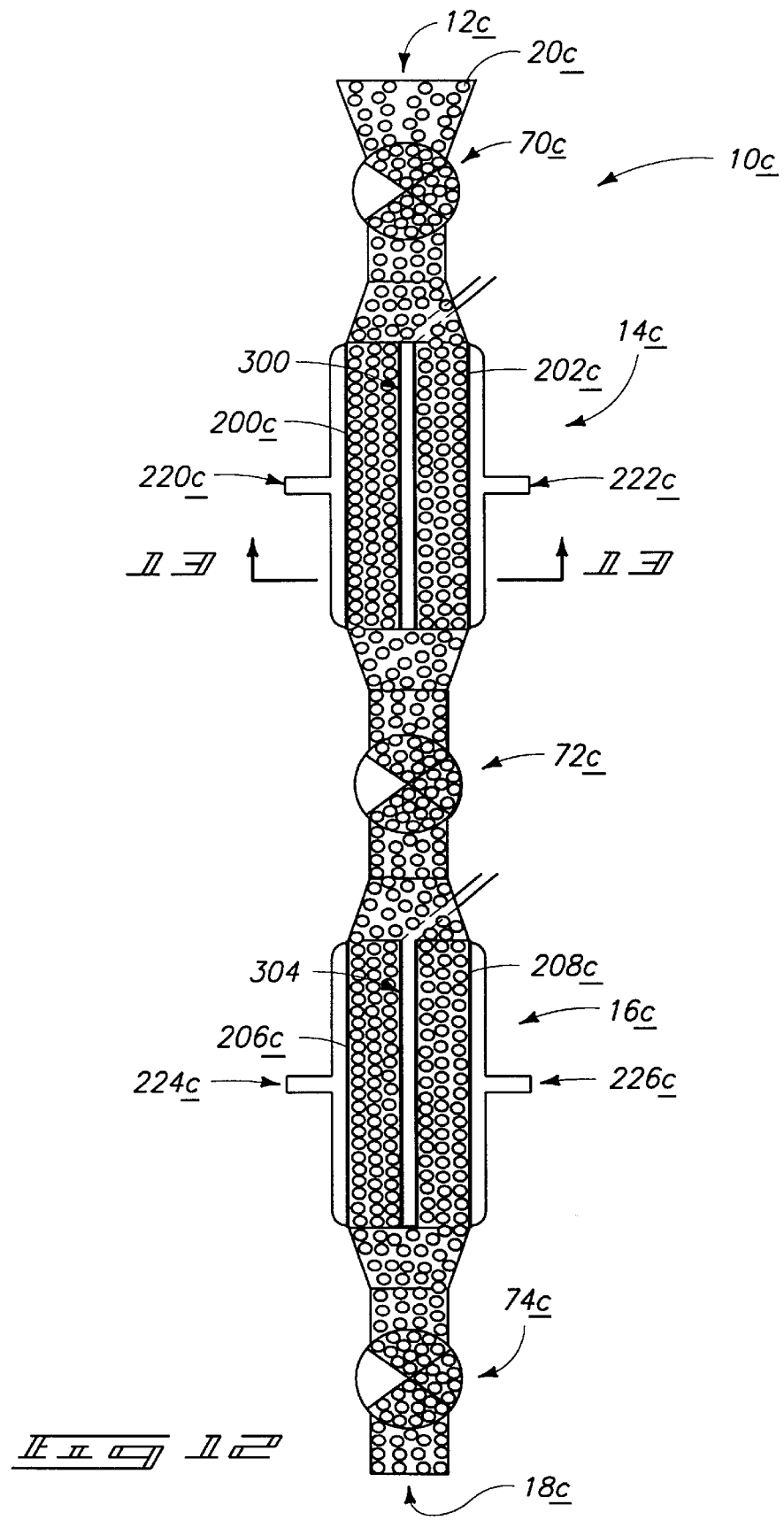
FIG. 12 is a view of yet another embodiment apparatus of the present invention.
Figure 13:
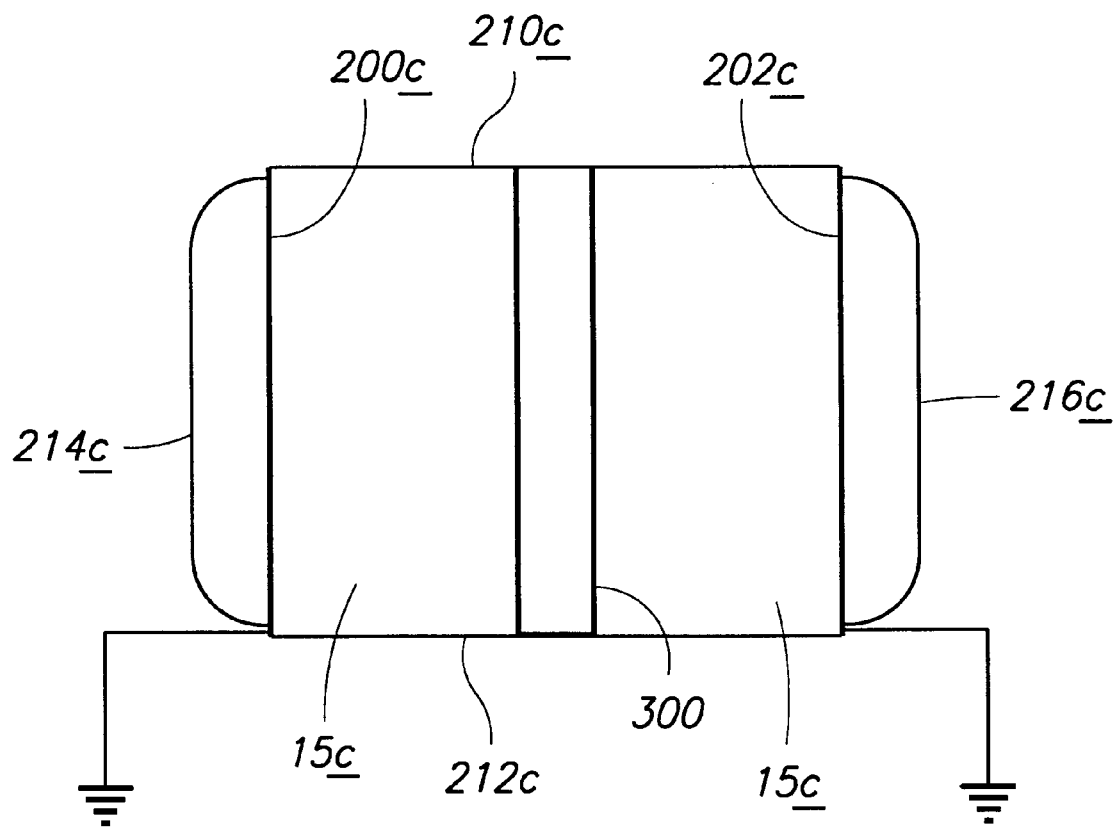
FIG. 13 is a view along the line 13—13 of FIG. 12.

FIGS. 12 and 13 illustrate another embodiment of the invention. In referring to FIGS. 12 and 13, similar numbering will be used as was used above in describing FIGS. 9–11, with the suffix "c" used to indicate structures pertaining to the embodiment of FIGS. 12 and 13.

Referring to FIG. 12, an apparatus 10c comprises an inlet port 12c and an outlet port 18c, and further comprises reaction zones 14c and 16c between the inlet and outlet ports. Reaction zones 14c and 16c are constructed similarly to those of apparatus 10b of FIG. 9, in that they comprise electrode plates 200c, 202c, 206c and 208c. Apparatus 10c is further similar to apparatus 10b of FIG. 9 in that it comprises gas ports 220c, 222c, 224c and 226c. A difference between the apparatus 20c of FIG. 12 and apparatus 10b of FIG. 9 is that apparatus 10c further comprises center electrodes 300 and 304 which extend within reaction zones 14c and 16c. Center electrodes 300 and 304 are preferably porous to enable a sweep gas or vacuum to be flowed through the center electrodes. Further, electrodes 200c, 202c, 206c and 208c are preferably porous to further enable sweep gases and/or a vacuum to be flowed through them. Center electrodes 300 and 302 can be driven by RF power, and outer electrodes 200c, 202c, 206c and 208c grounded to enable RF fields to be generated within reaction zones 14c and 16c.

FIG. 13 shows a top, cross-sectional view along line 13—13 of FIG. 12, and shows a portion of apparatus 10b isolated from the rest of the apparatus. As shown in FIG. 13, a flow material flow path 15c is bifurcated by center electrode 300. FIG. 13 further shows that electrodes 200c and 202c are spaced by dielectric spacers 210c and 212c analogous to the spacing of electrodes 200 and 202 of apparatus 10b (FIG. 10). Additionally, FIG. 13 shows gas ducts 214c and 216c formed over electrodes 200c and 202c, respectively.

Figure 14:
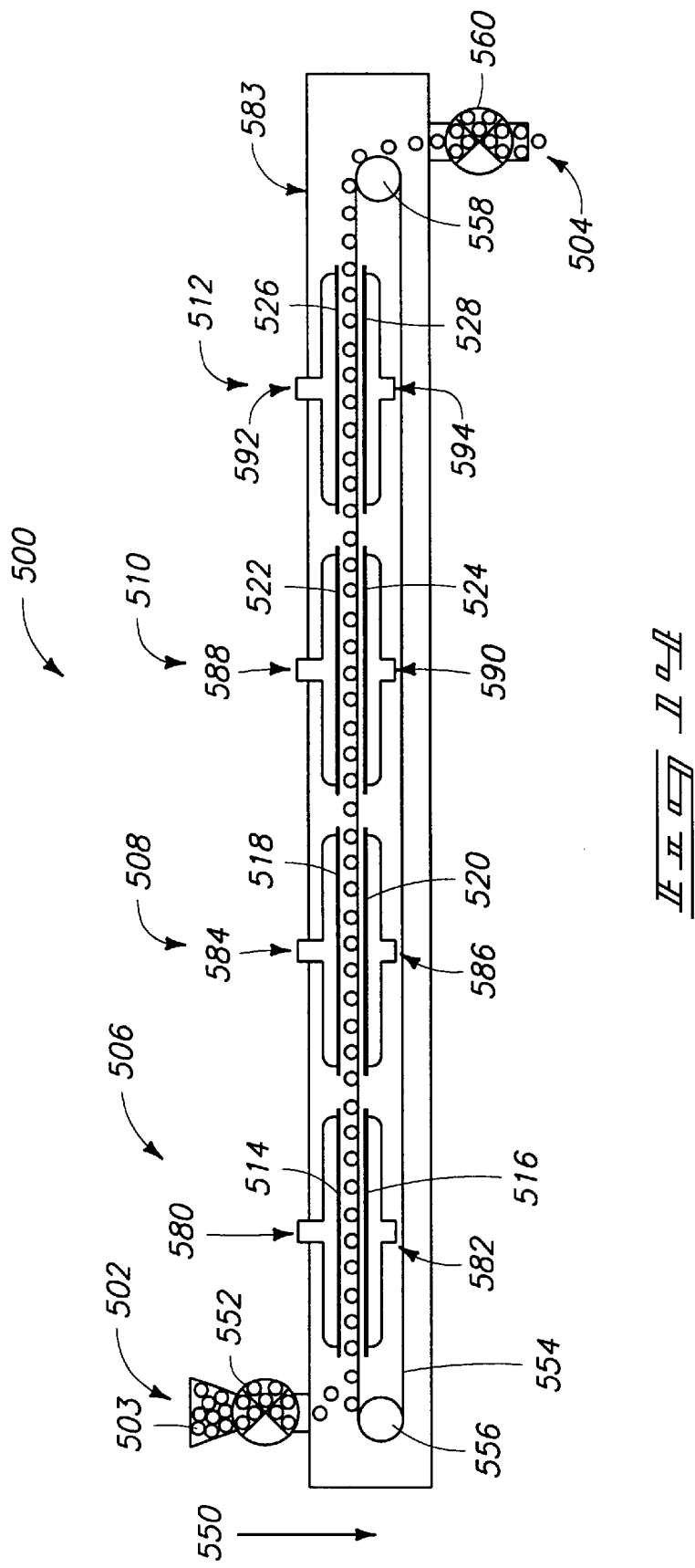
FIG. 14 is a diagrammatic, cross-sectional side view of yet another apparatus encompassed by the present invention.
Figure 15:
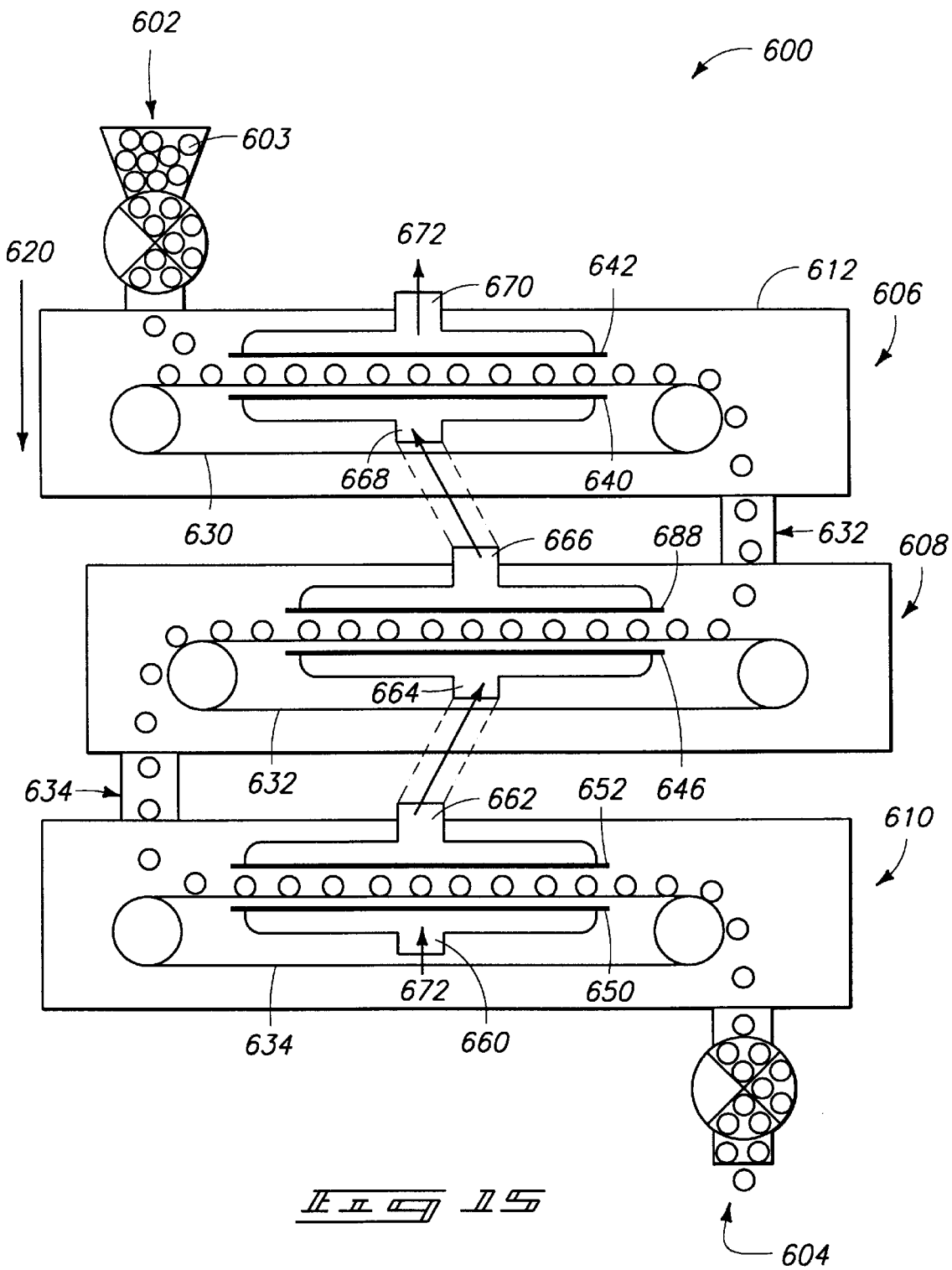
FIG. 15 is a diagrammatic, cross-sectional side view of yet another apparatus encompassed by the present invention.

The apparatuses described above with reference to FIGS. 2–7 and 9–12 have feed material flow paths which flow downwardly so that a gravitational force can pull feed through the apparatuses. FIGS. 14 and 15 illustrate alternative embodiments of the invention wherein feed material is conveyed horizontally.

Referring first to FIG. 14, an apparatus 500 comprises a feed material inlet port 502 and a feed material outlet port 504. A feed material flow path extends between inlet port 502 and outlet port 504. A plurality of RF frequency reaction zones 506, 508, 510 and 512 are provided along the feed material flow path. Each of the RF frequency treatment zones comprises a pair of spaced electrodes, with zone 506 comprising spaced electrodes 514 and 516; zone 508 comprising spaced electrodes 518 and 520; zone 510 comprising spaced electrodes 522 and 524; and zone 512 comprising spaced electrodes 526 and 528. The electrodes can be driven by conventional RF generators. Typically, the supper electrodes of each spaced pair will be the powered electrode, and the lower electrode will be connected to ground. The electrodes associated with each of reaction zones 506, 508, 510 and 512 can be shielded from electrodes associated with other reaction zones by appropriate RF shielding. Each of the reaction zones can comprise a different frequency or power of RF radiation relative to the others of the reaction zones. Alternatively, some or all of the reaction zones can comprise the same frequency and or power of RF radiation as one another.

A downward direction 550 is defined as a direction of the gravitational force of the earth, and is further defined to be a vertical direction. Accordingly, reaction zones 506, 108, 510 and 512 are defined to be horizontally spaced relative to one another.

In operation, a feed material 503 is fed into apparatus 500 through inlet port 502. In the shown embodiment, the feed material passes through an airlock 552 and then onto a belt 554. Belt 554 is supported by structures 556 and 558, and is utilized to convey feed material 503 horizontally through zones 506, 508, 510 and 512. Feed material 503 flows through each of reaction zones 506, 508, 510 and 512 at a constant speed, with such constant speed being determined by a rate of movement of belt 554. After passing through the reaction zones, feed material 503 falls into a second airlock 560, and subsequently passes out of apparatus 500 through outlet port 504.

If apparatus 500 is utilized for drying and/or solid state polymerization of nylon feed material, some of reaction zones 506, 508, 510 and 512 will preferably be at a different power and/or RF frequency than others of the reaction zones. Specifically, reaction zones which are more upstream along the feed material flow path will preferably have a higher power than will more downstream reaction zones. For instance, reaction zone 506 will preferably have a higher RF power than will reaction zones 508, 510 and 512.

Belt 554 is preferably constructed of a dielectric material having a relatively low dielectric loss factor, and which therefore does not heat up significantly in the RF fields of zones 506, 508, 510 and 512. Preferably, the material of belt 554 is also able to withstand a maximum temperature utilized within apparatus 500, such as, for example, a temperature utilized during polymer drying or SSP.

Sweep gas and/or vacuum can be utilized in conjunction with treating a material in apparatus 500. Accordingly, ports 580, 582, 584, 586, 588, 590, 592 and 594 are provided relative to reaction zones 506, 508, 510 and 512 for input of gas and/or vacuum. Reaction zones 506, 508, 510 and 512 can be isolated from one another by airlocks (not shown) to prevent sweep gas from mixing among the various reaction zones. Alternatively, sweep gas can be allowed to flow uninterrupted along an entirety of the feed material flow path between airlock 552 and airlock 560.

In particular embodiments, belt 554 can comprise a porous material which enables gas to flow through the belt, and accordingly gas can be pulled vertically through feed material 503 as it moves horizontally along the flow path. In the shown embodiment, ports 580, 582, 584, 586, 588, 590, 592 and 594 are associated with gas ducts extending above and below a feed material flow path, and configured for pulling vacuum and/or sweep gas vertically through feed material 503 on belt 554. Also, lower electrodes 516, 520, 524 and 528 can be porous to enable gas and/or vacuum to be pulled through them.

In the shown embodiment, belt 554 slides on the lower electrodes 516, 520, 524 and 528. Belt 554 can have a low-friction underside to improve sliding of the belt over the metal electrodes, or alternatively, low-friction sliders of, for example, TEFLON™ (available from Dupont) or other suitable low-friction materials can be interposed at intervals on the electrodes and utilized to space belt 554 from the electrodes. Preferably, such materials will not interfere with flow of sweep gas and/or vacuum. It is noted that upper electrodes 514, 518, 522 and 526 can be porous to allow gas and/or vacuum flow therethrough, or that additional duct work can be introduced to enable gas flow around the upper electrodes.

In particular embodiments, a feed material can be passed under a doctor blade (not shown) to taper sides of a polymer bed on belt 554 and maintain the bed at a uniform height. A temperature of the feed material flowing through apparatus 500 can be monitored by fiberoptic thermometry (not shown) or other temperature-monitoring processes, and the RF power of zones 506, 508, 510 and 512 adjusted to maintain a temperature of the feed material at a desired level. Methods of adjusting the RF power level will vary depending on the type of RF generator used. If amplifier-based generators are used, the RF power can be adjusted simply by lowering the gain of the amplifier. If oscillator-based generators are used, a plate voltage can be changed by changing the input voltage of the generator. The amount of power applied to feed material can be further adjusted by altering a distance between the upper and lower pair of electrodes.

As mentioned previously, the first electrode pair encountered by a feed material flowing through apparatus 500 is preferably at a higher power than subsequent electrode pairs if the apparatus is utilized for drying/SSP processes. Further, if the first stage is a drying stage, a rate of sweep gas and/or vacuum scavenging is also preferably higher than at subsequent stages due to an extra volume of liquid vapor expected to be expelled at the early drying stages. Subsequent power of downstream electrodes, and flow of downstream sweep gas, can be reduced if the amount of volatile material ejected from the feed material reduces at the later stages.

It is expected that a decrease in power between first reaction zone 506 and second reaction zone 508 would be high in a unit performing only SSP. Once the polymer has reached its SSP temperature in upstream reaction zone 506, downstream reaction zone 508 can be configured to provide only enough power to maintain a temperature of the feed material and provide increased diffusion and vaporization of volatile components expelled from the feed material. If apparatus 500 is utilized for both drying and polymerization of a feed material, a power level might decrease more gradually, as after initial heating in reaction zone 500 drying may not yet be complete by the time the material reaches reaction zone 508.

A method of maintaining various electrode pairs of different reaction zones at different power levels is to utilize RF "chokes" (not shown) between stages to prevent an RF field from one set of electrodes from interacting with an RP field from another set if electrodes.

Apparatus 500 can use a plurality of RF generators to provide different power levels at the various reaction zones. Alternatively, power levels from a single generator can be altered in the various reaction zones by varying electrode spacing, and/or connecting sections in series rather than parallel to reduce voltage in zones that are to have lower RF power relative to zones which are to have higher RF power.

It can be desired that polymer be mixed as it is moved on conveyor 554 to avoid channeling of sweep gas, and/or to alleviate polymer clumping. Mixing can be performed by, for example, vibration of belt 554. If belt 554 is vibrated, preferably walls of a dielectric material (such as, for example, G7) will be provided adjacent the belt to avoid having polymer fall off edges of the belt. The belt can be vibrated from below by a dielectric plate that contacts the belt and is If vibrated by mechanical means such as, for example, an oscillator or eccentric that communicates with the dielectric plate via a dielectric rod, plurality of rods, plate or other structural means. Utilization of dielectric materials for vibrating the belt will isolate the materials from an applied RF field. If a mixing device is utilized, such device can be isolated from RF fields by either: (1) being constructed of dielectric material; and/or (2) being isolated from the RF field by RF "chokes". Alternatively, other methods can be utilized for isolating the mixing devices from the RF field.

It is noted that once a material exits apparatus 500, it can be cooled by entry into a cooling unit (not shown) to a temperature suitable for further processing.

An airtight enclosure 583 surrounds reaction zones 506, 508, 510 and 512 so that an atmosphere within such reaction zones can be controlled. Accordingly, feed material 503 within apparatus 500 can be exposed to pressure at, above, or below ambient pressure. For instance, the system can be operated at vacuum (or partial vacuum) by drawing a vacuum through either an upper port (i.e., port 580) or lower port (for example, port 582), and providing a small amount of sweep gas through the other of the upper or lower ports. The system can be run at pressures near ambient by having sweep gas flowing through all the ports, without introduction of vacuum. It can be desirable to utilize a, sweep gas other than air to avoid having oxygen-induced oxidation of polymer within apparatus 500. Airlocks 552 and 560 avoid introduction of air into apparatus 500.

It can be preferred that a sweep gas be at about the same temperature as a treated material that the gas contacts. At such temperature, a gas may extract more liquid vapor from the treated material than it would at other temperatures.

A gas can be introduced through the various plenums in series until it becomes nearly saturated. For instance, gas can enter at port 594 and be extracted from port 592, subsequently introduced into port 590, drawn out through port 588, then introduced into port 5865, drawn out through port 584, and finally introduced to port 582 and drawn out through port 580. Such would constitute a counter-current sweep gas flow. However, in utilizing such flow, care should be taken to isolate upper electrodes associated with one reaction zone from electrodes associated with an adjacent reaction zone. Accordingly duct work associated with gas flow is preferably either electrically non-conductive, or suitably RF choked.

Sweep gas can be recycled and/or cleaned by procedures discussed previously.

Another embodiment of the invention is described with reference to an apparatus 600 in FIG. 15. Apparatus 600 comprises an inlet port 602 and an outlet port 604. A feed material 603 is introduced into inlet port 602 and follows a feed material flow path through reaction zones 606, 608, and 610, and then exits apparatus 600 through outlet port 604. Reaction zones 606, 608 and 610 apply RF energy to the feed material, and are vertically spaced relative to one another. Each of reaction zones 606, 608 and 610 is enclosed in an airtight enclosure 612.

A downward direction 620 is defined to be aligned with a gravitational force of the earth. Accordingly, zones 606, 608 and 610 are aligned downwardly relative to one another. Zones 606, 608 and 610 comprise belts 630, 632 and 634, respectively, which move feed material 603 horizontally through the reaction zones.

Feed material 603 is transferred from one reaction zone to another through transfer ducts 632 and 634.

The reaction zones comprise paired electrodes 640, 642, 646, 648, 650 and 652, and RF fields are generated between the paired electrodes. The zones can comprise the same RF power as one another, or different levels of RF power, and further can comprise the same RF frequencies as one another, or different RF frequencies. Advantages to utilizing different RF powers in polymer treatment apparatuses have been discussed previously in this document, and those advantages can be obtained utilizing the apparatus of FIG. 15.

Apparatus 600 comprises a series of gas ducts 660, 662, 664, 666, 668 and 670 which are interconnected to form a gas flow path 672. Sweep gas and/or vacuum can be introduced along such flow path. Dashed lines are utilized to illustrate interconnections between regions of the flow path that are in different reaction zones from one another It is noted that more than one electrode pair and/or more than one duct pair can be included within each of reaction zones 606, 608 and 610, even though only one pair of each is shown. It is also noted that some reaction zones can have either shorter belts or higher belt speeds than other reaction zones if exposure of feed material 603 in some of the reaction zones is to be shorter than in other reaction zones. For instance, during an initial heating step in SSP processing of polyamide material, an exposure time can be less than during subsequent lower power processing. Accordingly, the initial heating step can occur in a reaction zone with a shorter treatment area, and the subsequent lower power step can occur in a reaction zone with a relatively long treatment area.

Apparatus 600 can be advantageous relative to apparatus 500 (FIG. 14) in that it can utilize less floor space. Likewise, apparatuses 10 (FIG. 2), 10b (FIG. 9) and 10c (FIG. 12) can also be advantageous relative to apparatus 500.

It is noted that although the above apparatuses treat polymeric materials to different levels of power intensity by passing the materials through separate zones having different levels of power intensity from one another, the invention also encompasses embodiments wherein different power intensities are generated in a same reaction zone by providing variable power to an RF field generator. For instance, the apparatus 10a of FIG. 4 can be utilized to provide variable power intensities to a material. The power intensities could be, for example, combined with an automated temperature reading system (utilizing, for example, an infrared thermometer) and computer control to maintain a desired temperature of a material within apparatus 10a.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of increasing polymerization within a polyamide material, comprising:

providing a substantially dry and solid polyamide material; and solid state polymerizing the material by exposing the material to radiation having a frequency less than microwave frequency for a time of at least about 0.5 hour to increase an amount of polymerization within the material.

2. The method of claim 1 wherein the frequency of the radiation is less than or equal to about 500 MHz.

3. The method of claim 1 wherein the exposing time is at least about 2 hours.

4. The method of claim 1 wherein the exposing time is less than about 7 hours.

5. The method of claim 1 wherein the exposing comprises exposing the material to a first power intensity and subsequently exposing the material to a second power intensity, the first power intensity being higher than the second power intensity, the exposing to the second power intensity occurring for a longer period of time than the exposing to the first power intensity.

6. The method of claim 5 wherein the first power intensity is at least about 1.5 kW per kilogram of polyamide material, and the second power intensity is less than or equal to about 0.1 kW per kilogram of polyamide material.

7. The method of claim 1 wherein the material has an FAV value of less than or equal to about 50 before the exposing, and an FAV value of greater than or equal to about 200 after the exposing.

8. The method of claim 1 wherein the material has a first FAV value before the exposing and a second FAV value after the exposing, and wherein the second FAV value is at least twice as large as the first FAV value.

9. The method of claim 1 wherein the material has a first FAV value before the exposing and a second FAV value after the exposing, and wherein the second FAV value is at least three times larger than the first FAV value.

10. The method of claim 1 wherein the material has a first relative viscosity value before the exposing and a second relative viscosity value after the exposing, and wherein the second relative viscosity value is at least four times larger than the first relative viscosity value.

11. The method of claim 1 further comprising flowing a gas over the material during the exposing, the gas being inert relative to reaction with the material.

12. The method of claim 11 wherein the flowing gas is at a temperature greater than a temperature of the material.

13. A method of increasing polymerization within a polyamide, polyester, polyurethane, or other condensation polymer material, comprising:

providing a substantially dry polymeric material;

exposing the material to radiation having a frequency less than microwave frequency for a time of at least about 0.5 hour to increase an amount of polymerization within the material;

flowing a gas over the material during the exposing, the gas being inert relative to reaction with the material; and wherein the flowing gas is at a temperature less than a temperature of the material.

14. The method of claim 1 wherein the material is nylon.

15. The method of claim 1 wherein the material is nylon-6.

16. A method of increasing polymerization within a polyurethane material, comprising:

providing a substantially dry polyurethane material; and exposing the material to radiation having a frequency less than microwave frequency for a time of at least about 0.5 hour to increase an amount of polymerization within the material.

17. A method of treating a polymeric material, comprising:

providing a solid polymeric material;

exposing the material to radiation having a frequency of less than microwave frequency and variable power intensity to increase an amount of polymerization within the solid material and accordingly accomplish solid state polymerization within the solid material.

18. The method of claim 17 wherein the power intensity is varied from a first high power intensity of at least 1.5 kW per kilogram of polymeric material to a second low power intensity of less than or equal to 0.1 kW per kilogram of polymeric material.

19. A method of forming and treating nylon-6, comprising:

forming nylon-6 from caprolactam; and removing any unreacted caprolactam from the nylon-6 without exposing the nylon-6 to a water leach, the unreacted caprolactam being instead removed by exposing the nylon-6 to first radiation having a frequency of less than microwave frequency.

20. The method of claim 19 further comprising, after removing the unreacted caprolactam, exposing the nylon-6 to second radiation having a frequency of less than microwave frequency to increase polymerization within the nylon-6.

21. The method of claim 20 wherein the second radiation has a different power intensity relative to the nylon-6 than the first radiation.

22. A method of treating a solid polyamide material, comprising:

providing a solid polymeric polyamide material;

first exposing the solid material to first radiation, the first radiation having a first frequency of less than microwave frequency and being at a first power intensity; and second exposing the solid material to second radiation, the second radiation having a second frequency less than microwave frequency and being at a second power intensity;

the first power intensity being higher than the second power intensity.

23. The method of claim 22 wherein the first and second frequencies are less than or equal to about 500 MHz.

24. The method of claim 22 wherein the first and second frequencies are different from one another.

25. The method of claim 22 wherein the first and second frequencies are the same as one another.

26. A method of treating a polyamide material, comprising:

providing a polymeric polyamide material;

first exposing the material to first radiation, the first radiation having a first frequency of less than microwave frequency and being at a first power intensity;

second exposing the material to second radiation, the second radiation having a second frequency less than microwave frequency and being at a second power intensity;

the first power intensity being higher than the second power intensity; and substantially drying the polymeric polyamide material before the first exposing.

27. A method of treating a polyamide material, comprising:

providing a polymeric polyamide material;

first exposing the material to first radiation, the first radiation having a first frequency of less than microwave frequency and being at a first power intensity;

second exposing the material to second radiation, the second radiation having a second frequency less than microwave frequency and being at a second power intensity;

the first power intensity being higher than the second power intensity; and substantially drying the polymeric polyamide material with the first exposing.

28. A method of treating a polyamide material, comprising:

providing a polymeric polyamide material;

first exposing the material to first radiation, the first radiation having a first frequency of less than microwave frequency and being at a first power intensity;

second exposing the material to second radiation, the second radiation having a second frequency less than microwave frequency and being at a second power intensity;

the first power intensity being higher than the second power intensity; and wherein the exposing to the second radiation occurs for a longer period of time than the exposing to the first radiation.

29. The method of claim 22 wherein a combined time of the first and second exposing is at least about 2 hours.

30. The method of claim 22 wherein the second exposing occurs for a time at least about 2 hours.

31. A method of forming nylon, comprising:

providing a starting material comprising caprolactam;

polymerizing the caprolactam to form initial nylon polymers;

reacting the initial nylon polymers with one another to form a nylon material having an FAV value of greater than 200; the reacting occurring while exposing the initial nylon polymers to first radiation having a frequency of less than microwave radiation.

32. The method of claim 31 wherein the frequency of the radiation is less than or equal to about 500 MHz.

33. The method of claim 31 further comprising soaking the initial nylon polymers in water after the polymerizing, and substantially drying the initial nylon polymers before at least some of the reacting.

34. The method of claim 33 wherein the substantially drying comprises substantially drying the initial nylon polymers during exposure to second radiation comprising non-microwave, radio-frequency radiation.

35. The method of claim 31 further comprising exposing the starting material to second radiation comprising non-microwave, radio-frequency radiation during the polymerizing.

36. A method of forming nylon with an apparatus comprising an inlet port, an outlet port, and a feed material flow path from the inlet port to the outlet port; the flow path comprising at least two radiation reaction zones which comprise different power in tensities of radiation relative to one another; a first of the reaction zones being upstream of an other of the reaction zones along the flow path; the radiation of the first reaction zone being at a higher power intensity than the radiation of said other of the reaction zones; the method comprising the following steps in the listed sequence:

feeding a nylon feed material into the apparatus through the inlet port, the nylon feed material being predominately a solid state polymer;

transferring the nylon feed material from the inlet port to the first reaction zone;

treating the nylon feed material with the radiation of the first reaction zone;

transferring the nylon feed material along the flow path to the second reaction zone;

treating the nylon feed material with the radiation of the second reaction zone, the nylon feed material undergoing solid state polymerization during treatment with the radiation of the second reaction zone;

transferring the nylon feed material from the second reaction zone to the outlet port; and passing the nylon feed material through the outlet port and out of the apparatus.

37. The method of claim 36 wherein the nylon feed material has a first FAV value before being fed to the apparatus through the inlet port and a second FAV value after passing through the second reaction zone, and wherein the second FAV value is at least twice as large as the first FAV value.

38. The method of claim 37 wherein the second FAV value is at least three times larger than the first FAV value.

39. The method of claim 37 wherein the second FAV value is at least four times larger than the first FAV value.

40. The method of claim 36 wherein the nylon feed material enters the inlet port as a substantially dry material.

41. A method of forming nylon with an apparatus comprising an inlet port, an outlet port, and a feed material flow path from the inlet port to the outlet port; the flow path comprising at least two radiation reaction zones which comprise different power intensities of radiation relative to one another; a first of the reaction zones being upstream of an other of the reaction zones along the flow path; the radiation of the first reaction zone being at a higher power intensity than the radiation of said other of the reaction zones; the method comprising the following steps in the listed sequence:

feeding a nylon feed material into the apparatus through the inlet port;

transferring the nylon feed material from the inlet port to the first reaction zone;

treating the nylon feed material with the radiation of the first reaction zone;

transferring the nylon feed material along the flow path to the second reaction zone;

treating the nylon feed material with the radiation of the second reaction zone;

transferring the nylon food material from the second reaction zone to the outlet port;

passing the nylon feed material through the outlet port and out of the apparatus; and wherein the nylon feed material enters the inlet port predominately as caprolactam, and is converted to polymer within the apparatus.

42. The method of claim 36 wherein the feed material flow path is aligned downward relative to a gravitational force of the earth, and wherein the nylon feed material travels downwardly from the first reaction zone to the second reaction zone.

43. The method of claim 36 wherein the gravitational force of the earth defines a vertically downward direction, wherein the feed material flow path extends horizontally between the first and second reaction zones; and wherein the transferring the feed material from the first reaction zone to the second reaction zone comprises conveying the feed material along the horizontally extending flow path.

44. A method of forming nylon with an apparatus comprising an inlet port, an outlet port, and a feed material flow path from the inlet port to the outlet port; the flow path comprising at least two radiation reaction zones which comprise different power intensities of radiation relative to one another; a first of the reaction zones being upstream of an other of the reaction zones along the flow path; the radiation of the first reaction zone being at a higher power intensity than the radiation of said other of the reaction zones; the method comprising the following steps in the listed sequence:

feeding a nylon feed material into the apparatus through the inlet port;

transferring the nylon feed material from the inlet port to the first reaction zone;

treating the nylon feed material with the radiation of the first reaction zone;

transferring the nylon feed material along the flow path to the second reaction zone;

treating the nylon feed material with the radiation of the second reaction zone;

transferring the nylon feed material from the second reaction zone to the outlet port;

passing the nylon feed material through the outlet port and out of the apparatus; and flowing a gas stream against feed material that is along the feed material flow path.

45. The method of claim 44 wherein the gas stream flows in a same direction as the feed material flow path.

46. The method of claim 44 wherein the gas stream flows in an opposite direction as the feed material flow path.

47. The method of claim 44 wherein the gas stream flows against the nylon feed material in both the first and second reaction zones.

48. The method of claim 44 wherein the gas stream flows against the nylon feed material in only one of the first and second reaction zones; and further comprising flowing another gas stream against the nylon feed material in the other of the first and second reaction zones.

* * * * *

UNITED STATES PATENT AND TRADEMARK OFFICE
CERTIFICATE OF CORRECTION

PATENT NO.     : 6,316,518 B1
DATED          : November 13, 2001
INVENTOR(S)    : L. Myles Phipps et al.

It is certified that error appears in the above-identified patent and that said Letters Patent is hereby corrected as shown below:

Title page,
Item [57], ABSTRACT,
Line 17, replace "port, The" with -- port. The --

Column 1,
Lines 35-37, Roman numeral I should be moved to the beginning of the equation
Line 58, replace "(CH$_2$)5-COOH" with -- (CH$_2$)$_5$-COOH --
Lines 58-64, Roman numerals II, III and IV should be moved to the beginning of the equation
Lines 65-67, Roman numerals V and VI should be reversed Column 3,
Line 9, replace "chips to a solid" with -- chips to solid --
Line 26, replace "nylon-6if the" with -- nylon-6 if the --
Line 31, replace "extrugion, pelletizing" with -- extrusion, pelletizing --
Lines 45-48, Roman numeral VII should be moved to the beginning of the equation Column 8,
Line 55, replace "drops go low" with -- drops so low --

Column 9,
Line 34, replace "500 MHz, mote preferably" with -- 500 MHz, more preferably --
Line 48, replace "process is of FIG. 1." with -- process of FIG. 1. --

Column 11,
Line 27, replace "of SSF beyond" with -- of SSP beyond --
Line 65, replace "the SSP Such" with -- the SSP. Such --

Column 12,
Line 29, replace "Since thy RF energy" with -- Since the RF energy --

Column 14,
Table 1, line 16, replace "°C." with -- C. --
Table 2, line 36, replace "°C." with -- C. --
Table 2, line 39, replace "192-44" with -- 192-4 --
Table 3, line 50, replace "Ave. SS temp. °C." with -- Ave. SS temp. C. --

UNITED STATES PATENT AND TRADEMARK OFFICE
CERTIFICATE OF CORRECTION

PATENT NO.    : 6,316,518 B1
DATED         : November 13, 2001
INVENTOR(S)   : L. Myles Phipps et al.

It is certified that error appears in the above-identified patent and that said Letters Patent is hereby corrected as shown below:

Column 15,
Table 4, line 14, replace Temp. °C." with -- Temp. C. --
Line 44, replace "water has a," with -- water has a --

Column 16,
Line 56, replace "gravity still feed" with -- gravity pulls feed --

Column 17,
Line 2, replace "can be urged to form" with -- can be configured to form --
Line 10, replace "such as, far example," with -- such as, for example, --
Line 30, replace "output the generator," with -- output of the generator, --
Line 46, replace "electrodes 29 and 30" with -- electrodes 28 and 30 --

Column 19,
Line 41, replace "with, a first stage" with -- with a first stage --

Column 20,
Line 42, replace "it call be a" with -- it can be a --

Column 21,
Line 11, replace "14$a$ a differs" with -- 14$a$ differs --
Line 36, replace "move threaded," with -- move threaded --

Column 22,
Line 34, replace "24$a$either" with -- 24$a$ either --

Column 24,
Line 40, replace "sweep gag flowed" with -- sweep gas flowed --
Line 46, replace "and 216  It is" with -- and 216. It is --

Column 26,
Line 9, replace "the supper elec-" with -- the upper elec --
Line 22, replace "zones 506, 108," with -- zones 506, 508, --

UNITED STATES PATENT AND TRADEMARK OFFICE
CERTIFICATE OF CORRECTION

PATENT NO. : 6,316,518 B1
DATED : November 13, 2001
INVENTOR(S) : L. Myles Phipps et al.

It is certified that error appears in the above-identified patent and that said Letters Patent is hereby corrected as shown below:

Column 27,
Line 66, replace "an RP field" with -- an RF field --

Column 33,
Line 5, replace "power in tensities of" with -- power intensities of --

Signed and Sealed this

Eighteenth Day of February, 2003

JAMES E. ROGAN
*Director of the United States Patent and Trademark Office*